(12) United States Patent
Takahashi et al.

(10) Patent No.: US 7,118,207 B2
(45) Date of Patent: Oct. 10, 2006

(54) INK-JET COLOR RECORDING INK, COLOR INK FEEDING DEVICE USING THE INK, AND INK-JET COLOR RECRODING APPARATUS AND METHOD USING THE INK

(75) Inventors: Hideki Takahashi, Ome (JP); Kenichiro Asako, Kokubunji (JP); Koichi Kamei, Hino (JP); Shigeru Shimizu, Iruma (JP)

(73) Assignees: Casio Computer Co., Ltd., Tokyo (JP); Casio Electronics Manufacturing Co., Ltd., Iruma (JP)

( * ) Notice: Subject to any disclaimer, the term of this patent is extended or adjusted under 35 U.S.C. 154(b) by 278 days.

(21) Appl. No.: 10/745,790

(22) Filed: Dec. 23, 2003

(65) Prior Publication Data

US 2004/0135861 A1    Jul. 15, 2004

(30) Foreign Application Priority Data

Dec. 27, 2002  (JP) .............................. 2002-381120
Mar. 28, 2003  (JP) ............................... 2003-90194

(51) Int. Cl.
*B41J 2/17* (2006.01)

(52) U.S. Cl. ................. 347/100; 347/100; 347/96; 347/98; 106/31.16

(58) Field of Classification Search ............... 347/100, 347/98, 96; 106/31.16
See application file for complete search history.

(56) References Cited

U.S. PATENT DOCUMENTS 4,089,834 A * 5/1978 Powell .......................... 521/62
5,798,779 A * 8/1998 Nakayasu et al. ............. 347/46
5,883,043 A * 3/1999 Halbrook et al. ............ 503/204
6,824,258 B1 * 11/2004 Yamamoto et al. ............ 347/86

FOREIGN PATENT DOCUMENTS

| EP | 0 485 064 A1 | 5/1992 |
| JP | 9-249841 A | 9/1997 |
| JP | 11-058832 A | 3/1999 |
| JP | 2000-289236 A | 10/2000 |
| JP | 2001-301156 A | 10/2001 |

* cited by examiner

*Primary Examiner*—Stephen Meier
*Assistant Examiner*—Laura E. Martin
(74) *Attorney, Agent, or Firm*—Frishauf, Holtz, Goodman & Chick, P.C.

(57) ABSTRACT

Ink for use in an ink-jet color recording apparatus and a plurality of kinds of small microcapsules dispersed in the solvent, each small microcapsule having an outer shell destroyable with ultrasonic waves of a predetermined resonant frequency, each small microcapsule containing a color former within its outer shell with the outer surface of the outer shell covered with a developer. The plurality of kinds of small microcapsules are destroyed selectively with the corresponding predetermined stimuli to thereby produce magenta, cyan, yellow or black. The ink is colorless before producing the color. The ink-jet color recording apparatus irradiates the plurality of small microcapsules with ultrasonic waves of a selected frequency corresponding to a desired color to thereby change the color of the ink on a path through which the ink is fed from a color ink feeding device to an ink cartridge.

43 Claims, 23 Drawing Sheets

RIGHT-SIDE CROSS-SECTIONAL VIEW

INK-JET COLOR RECORDING INK, COLOR INK FEEDING DEVICE USING THE INK, AND INK-JET COLOR RECRODING APPARATUS AND METHOD USING THE INK

BACKGROUND OF THE INVENTION

1. Field of the Invention

The present invention relates to ink-jet color recording ink containing microcapsules destroyable with a predetermined stimulus, color ink feeding devices using the ink, and ink-jet color recording apparatus and methods using the ink.

2. Description of the Related Art

Recently, with the spread of computers as information devices whose main ones are personal computers, printers have spread as one of their peripherals. The printers include ones of various types such as, for example, electrophotographic, heat-transfer, and ink-jet recording types. Among others, the full-color printers of the ink-jet recording type have remarkably advanced in which the color images formed thereby tend to match and supersede photographs taken by the conventional silver-salt analog cameras in terms of beautifulness and resolution.

The printers of this ink-jet recording type include ones of the thermal jet type in which the ink droplets are repelled by the force of air bubbles produced by the heaters thereof, and ones of the piezoelectric type in which the ink droplets are repelled by deformation of a piezoelectric element.

In full-color printing, different types of ink with three primary colors: magenta (red), cyan (greenish blue) and yellow, of a subtractive color mixture are usually used. In addition, black ink is used exclusively to print characters and/or black image portions on demand.

Each of these printers ejects ink droplets from an ejection nozzle of its printing head against a recording material such as paper or cloth to cause it to absorb the ink droplets to thereby print characters/images. This printing need not perform a special fixing process. These printers are simple in structure and used as personal ones.

FIG. 24 is a schematic perspective view of a conventional ink-jet printer that performs full-color printing, for example, disclosed in Unexamined Japanese Patent Application KOKAI Publication No. 2000-289236.

This printer 101 of FIG. 24 is a small one used personally in a household. A printing head 103 and an ink cartridge 104 that contains ink are attached to a carriage 102.

The carriage 102 is supported slidable on a guide shaft 105 and also fixed to a toothed drive belt 106. Thus, the printing head 103 and the ink cartridge 104 are moved back and forth longitudinally of the printer 101, in the directions of a double-headed arrow C or in a primary scan direction for printing. A flexible communications cable 107 is connected between the printing head 103 and a controller (not shown) of the printer so that print data and control signals are sent from the controller to the printing head 103 through the cable 107.

A platen 109 is disposed at a lower end of a frame 108 of the printer, extending in the primary scan direction of the printing head 103 so as to face the printing head 103. Printing paper P is intermittently conveyed in a secondary print-scan (obliquely lower left) direction of an arrow D by pairs of feed rollers 110 (their lower rollers are behind the printing paper P and not shown) and pairs of discharge rollers 111 (their lower rollers are likewise behind the printing paper and not shown) while the paper is being held between each pair of feed rollers 110 and between each pair of discharge rollers 111.

During a time when the intermittent conveyance of the printing paper P is at a stop, the printing head 103 is driven by a motor 112 through the toothed drive belt 106 and the carriage 102 while ejecting ink droplets against and close to the printing paper to thereby print characters/images. The whole surface of the printing paper P is printed by repeating its intermittent conveyance and reciprocal printing that are performed by the printing head 103 on the printing paper P. The quantity of each type of color ink consumed in printing is newly supplemented from the ink cartridge 104 to the printing head 103.

In one arrangement, the carriage 102 is fixed to the printing head 103 on which the ink cartridge 104 is settable. In another arrangement, a head unit that includes the printing head 103 and the ink cartridge 104 as a unit is fixed removable to the carriage 102.

The printer of FIG. 24 shows that the printing head 103 and the ink cartridge 104 are integral with each other as the head unit.

The ink cartridge 104 of FIG. 24 has three divided chambers 113 that contain porous materials (not shown) impregnated sufficiently with magenta, cyan and yellow ink, respectively, to an extent that they do not flow uselessly away from the ink chambers due to gravity.

These three ink chambers 113 have outlets in the bottoms of the ink chambers 113 that feed the respective types of color ink therethrough to the printing head 103 so that the three types of color ink within the respective ink chambers 113 are fed through ink paths to the corresponding ink-injection nozzle lines in the printing head 103.

FIG. 25 is a schematic perspective view of a conventional full-color ink-jet printer including a separated printing head and ink cartridges.

In the printer 114 of FIG. 25, the printing head 115 is supported by a carriage 116 so as to face a platen roller 117. The carriage 116 is supported slidable by a guide shaft 118 and engaged with a toothed belt 119, which is driven forwardly or backwardly through gears (not shown) by rotating a motor 120 forwardly or backwardly. Thus, the printing head 115 slides along the platen roller 117 longitudinally in the directions of a double headed arrow C (in the primary scan direction) to thereby print characters and/or images on the printing paper P.

The platen roller 117 and auxiliary rollers 121 support the printing paper P therebetween to thereby convey the printing paper P in the direction of arrow D widthwise (in the secondary scan direction) in an intermittent manner to thereby cause the printing head 115 to print in lines sequentially.

Provided removable on the carriage 116 are a black ink cartridge 123 that contains a black ink and a color ink cartridge 124 which has three divided chambers that contain magenta, cyan and yellow color ink, respectively.

FIG. 26A schematically illustrates a main portion of the color printer of the ink-jet recording type. FIG. 26B is a front view of an ink-spitting surface of the printing head (as viewed in the direction of an arrow E in FIG. 26A). While FIGS. 26A and 26B illustrate the use of four different types of colored ink of FIG. 25, this is substantially applicable when three different types of color ink of FIG. 24 are used.

As shown in FIG. 26A, the printing head 7 is disposed close to printing paper P so that the former moves right and left and in the direction perpendicular to the paper face of FIG. 26A relative to the latter.

Provided on the printing head 7 are ink cartridges 8 (8*m*, 8*c*, 8*y* and 8*k*) that contain four different types of color ink (magenta (M), cyan (C), yellow (Y) and black (K)) through four corresponding ink feed paths 9, for example, of a pipe.

As shown in FIG. 26B, the printing head 7 includes a nozzle array of four different-color nozzle lines 10 on its ink ejection surface with each nozzle line 10 having ejection outlets 11 at a density, for example, of approximately 12 outlets per millimeter. The printing head 7 ejects from the nozzle array different-colored ink droplets fed by the cartridges 8 corresponding to the respective nozzle lines 10 against the printing paper to thereby print characters/images in colors.

As described above, such conventional printer prints images in full color, using three different types of color ink of magenta, cyan and yellow, and/or an additional type of color ink of black. In order to form a good color image using such printer, expression of the image in multigradation is required. In this respect, in the past the multigradation was expressed using area gradation. In order to form a preciser image, using a recent full-color ink-jet printer, however, the use of the area gradation is not satisfactory. In order to express the preciser image in concentration multigradations, a total of 6 or 7 different types of color ink whose colors include the three primary colors; magenta, cyan and yellow, and other derivatives, that is, light magenta, light cyan and dark yellow is often used.

In the ink-jet printer, ink droplets are generally repelled out by the force of bubbles produced by its heaters or by the force produced by deformation of a piezoelectric element used. A so-called acoustic ink-jet printer is also known as another technique, for example, disclosed in Unexamined Japanese Patent Application KOKAI Publication No. 2001-301156 in which ultrasonic waves are focused on a point on a free surface of ink to cause ink droplets to be spit out from the free surface of the ink by the energy of the ultrasonic waves.

In contrast to the conventional color-image forming system, a color image forming apparatus of a new type is proposed, for example, in Unexamined Japanese Patent Application KOKAI Publication No.H11-58832 in which external stimulus such as light, heat or ultrasonic waves corresponding to image information are given to dedicated recording paper coated with an ink layer that contains magenta, cyan and yellow microcapsules which respond to the external stimulus to thereby form a color image.

When the conventional ink-jet recording printer prints, however, different amounts of magenta, cyan, yellow and black ink are used depending on the contents of the printing and the corresponding quantities of the ink need be supplemented at the respective different timings. That is, management of the respective color ink cartridges is troublesome.

Especially, in the ink cartridge assembly that includes three different color (magenta, cyan, yellow) ink cartridges formed integrally as a unit (the ink cartridges 104 and 124 of FIGS. 24 and 25, respectively) the whole ink cartridge assembly (104 or 124) need be replaced with another even when only one type of color ink is used up and the other types of color ink remain. Therefore, a big economic load is imposed as a maintenance cost on the user, undesirably.

This also applies to the printers using the above-described 6 or 7 types of color ink. In that case, 6 or 7 different ink cartridges need be prepared always at hand and management of the ink cartridges is more troublesome.

In addition, the printer body has 6 or 7 ink feeders, which renders the structure of the printer complicated and increases the cost of the printer accordingly.

In the color image forming apparatus using the dedicated printing paper coated with the ink layer that contains microcapsules (Unexamined Japanese Patent Application KOKAI Publication No. H11-58832), the whole surface of the recording paper is basically coated with the three different types of color ink, which increases the cost of the printing because some of the types of ink are used wastefully. In addition, in this case general paper cannot be used for printing. Furthermore, the printing process is repeated in different colors, so that a discrepancy in printed color is difficult to control, which renders the printer complicated inevitably.

SUMMARY OF THE INVENTION

It is therefore an object of the present invention to provide ink capable of producing a selected one of different colors and simplifying the structure of its manufacturing device and also to provide a color ink feeding device and an ink-jet color recording apparatus and method, handy and capable of easily managing each color ink and providing expression of the image in precicer gradations without using the ink wastefully.

In order to achieve the above object, the present invention provides ink for ink-jet color recording, the ink comprising a solvent and a plurality of small microcapsules or a plurality of large microcapsules dispersed in the solvent, each large microcapsule containing a plurality of the small microcapsules, each small microcapsule having an outer shell destroyable with a predetermined stimulus, each small microcapsule containing in a dispersed state within its outer shell one of two reactive materials that react to each other when mixed, the other of the two reactive materials being dispersed outside the outer shell of that small microcapsule in the solvent, wherein when the outer shell of that small microcapsule is destroyed with the predetermined stimulus, the two reactive materials are diffused and mixed to thereby perform a coloring reaction.

In this ink, the solvent may be substantially colorless, the small and large microcapsules being substantially colorless before the coloring reaction, the plurality of small microcapsules including in a mixed state a plurality of different kinds of small microcapsules producing a plurality of different colors with the corresponding predetermined stimuli in the coloring reaction.

Also, in this ink the plurality of kinds of small microcapsules may produce colors of magenta, cyan, yellow and black, respectively.

Further, in this ink the predetermined stimulus may comprise ultrasonic waves and the outer shell of the small microcapsule is destroyed with ultrasonic waves of a resonant frequency corresponding to a characteristic based on the material, thickness or diameter thereof.

Moreover, in this ink each small microcapsule may include a security-printing fluorescent material dispersed outside or inside its outer capsule shell such that a print based on the ink generates fluorescence when irradiated with ultraviolet rays.

In addition, in this ink the solvent may be precolored in a predetermined color, and each of the plurality of small microcapsules may produce the same color as the solvent due to the coloring reaction.

Also, in this ink the solvent may have a color of magenta, cyan, yellow or black.

The present invention also provides a color ink feeding device for feeding a plurality of different types of color ink to a like number of ink containing units, respectively, the device comprising:

an ink container for containing ink that comprises a solvent and a plurality of different kinds of small microcapsules or a plurality of large microcapsules dispersed in the solvent, each large microcapsule containing a plurality of the small microcapsules, that small microcapsule having an outer shell destroyable with a corresponding predetermined stimulus, each small microcapsule containing in a dispersed state within its outer shell one of two reactive materials that react to each other when mixed, the other of the two reactive materials being dispersed outside the outer shell of that microcapsule in the solvent, wherein when the outer shell of that microcapsule is destroyed by the predetermined stimulus, the two reactive materials are diffused and mixed to thereby perform a coloring reaction;

ink distributing means for separating and feeding a part of the ink contained in the ink container to a respective one of the like number of ink containing units; and a coloring unit for coloring the separated part of the ink in a color for the respective one of the like number of ink containing units with the corresponding predetermined stimulus before the colored part of the ink is fed to the respective one of the like number of ink containing units.

In this device, the solvent may be substantially colorless, the small and large microcapsules being substantially colorless before the coloring reaction.

Also, in this device the plurality of different kinds of small microcapsules may produce colors of magenta, cyan, yellow and black, respectively.

Further, in this device the predetermined stimulus may comprise ultrasonic waves and the outer shell of each small microcapsule may be destroyed with ultrasonic waves of a resonant frequency corresponding to a characteristic based on the material, thickness or diameter thereof.

Further, the present invention provides an ink-jet color recording apparatus for ejecting from a printing head a plurality of different types of color ink fed from a like number of ink containing units, respectively, to thereby record an image or data on paper, the apparatus comprising:

an ink container for containing ink that comprises a solvent, a plurality of kinds of small microcapsules or a plurality of large microcapsules dispersed in the solvent, each large microcapsules containing a plurality of the kinds of small microcapsules, the small microcapsules of each type having outer shells destroyable with the corresponding predetermined stimulus, each small microcapsule containing in a dispersed state within its outer shell one of two reactive materials that react to each other when mixed, the other of the two reactive materials being dispersed outside the outer shell of that microcapsule in the solvent, wherein when the outer shell of that microcapsule is destroyed with the predetermined stimulus, the two reactive materials are dispersed and mixed to thereby perform a coloring reaction;

ink distributing means for separating and feeding a part of the ink contained in the ink container to a respective one of the like number of ink containing units; and a coloring unit for coloring the separated part of the ink in a color for the respective one of the like number of ink containing units with the corresponding predetermined stimulus before the colored part of the ink is fed to the respective one of the like number of ink containing units.

In this apparatus, the solvent may be substantially colorless, the small and large microcapsules being substantially colorless before the coloring reaction.

Also, in this apparatus the plurality of kinds of different small microcapsules may produce colors of magenta, cyan, yellow and black, respectively.

Further, in this apparatus the predetermined stimulus may comprise ultrasonic waves and the outer microcapsule shell each small microcapsule may be destroyed with ultrasonic waves of a resonant frequency corresponding to a characteristic based on the material, thickness or diameter thereof.

Moreover, the present invention provides an ink-jet color recording method of ejecting from a printing head a plurality of different types of color ink fed from a like number of ink containing units, respectively, to thereby record an image or data on paper, the method comprising the steps of:

containing in an ink container ink that comprises a solvent and a plurality of kinds of small microcapsules or a plurality of large microcapsules dispersed in the solvent, each large microcapsule containing a plurality of the kinds of small microcapsules, the small microcapsules of each type having an outer shell destroyable with the corresponding predetermined stimulus, each small microcapsule containing in a dispersed state within its outer shell one of two reactive materials that react to each other when mixed, the other of the two reactive materials being dispersed outside the outer shell of that microcapsule in the solvent, wherein when the outer shell is destroyed with the predetermined stimulus, the two reactive materials are dispersed and mixed to thereby perform a coloring reaction;

separating and feeding a part of the ink contained in the ink container to a respective one of the like number of ink containing units; and coloring the separated part of the ink in a color for the respective one of the like number of ink containing units with the corresponding predetermined stimulus before the colored part of the ink is fed to the respective one of the like number of ink containing units.

In this method, the solvent may be substantially colorless, the small and large microcapsules being substantially colorless before the coloring reaction.

Also, in this method the plurality of kinds of different small microcapsules may produce colors of magenta, cyan, yellow and black, respectively.

Further, in this method the predetermined stimulus may comprise ultrasonic waves and the outer microcapsule shell of each small microcapsule may be destroyed with ultrasonic waves of a resonant frequency corresponding to a characteristic based on the material, thickness or diameter thereof.

Further, the present invention provides an ink-jet color recording apparatus using ink that comprises a solvent and a plurality of small microcapsules or a plurality of large microcapsules dispersed in the solvent, each large microcapsule containing a plurality of the small microcapsules, each small microcapsule having an outer shell destroyable with a predetermined stimulus, each small microcapsule containing in a dispersed state within its outer shell one of two reactive materials that react to each other when mixed, the other of the two reactive materials being dispersed outside the outer shell of that small microcapsule in the solvent, wherein when the outer shell of that small microcapsule is destroyed by the predetermined stimulus, the two reactive materials are diffused and mixed to thereby perform a coloring reaction, the apparatus comprising:

an ink ejection nozzle fed with the ink and having an ink ejection outlet for ejecting the ink therethrough;

coloring means disposed in the vicinity of the ink ejection outlet of the ink ejection nozzle for coloring the ink in the vicinity of the ejection outlet in the coloring reaction by giving the microcapsules of the ink in the vicinity of the ink ejection outlet a stimulus depending on information on a color component of an image to be recorded to thereby destroy the outer shells of the small microcapsules of the ink corresponding to the stimulus; and ink droplet discharging means disposed inward from the ink injection outlet along the ink ejection nozzle for ejecting an ink droplet of the part of the ink colored by the coloring means in the vicinity of the ink ejection outlet to thereby form a color image on recording paper.

In this apparatus, the coloring means may comprise an ultrasonic element for irradiating the ink with ultrasonic waves of a predetermined frequency, and the ink droplet ejecting means may comprise a heater for heating the ink to produce film bubbles in the ink.

Also, in this apparatus a plurality of the ink ejection nozzles may be arranged in parallel in a line to thereby compose a line recording head of a multinozzle type.

Further, in this apparatus the solvent is substantially colorless, the small and large microcapsules being substantially colorless before the coloring reaction, the plurality of small microcapsules including in a mixed state a plurality of different kinds of small microcapsules producing a plurality of different colors with the corresponding predetermined stimuli in the coloring reaction.

Moreover, in this apparatus the plurality of kinds of small microcapsules may produce the colors of magenta, cyan, yellow and black.

Also, in this apparatus the solvent may be precolored in a predetermined color, and the plurality of small microcapsules is colored in the same color as the color of the solvent due to the coloring reaction;

the ink ejection nozzle may eject through its ejection outlet an ink droplet with only the color of the precolored solvent when the ink coloring means gives the ink no predetermined stimulus depending on information on a color component of an image to be recorded; and the ink ejection nozzle may eject through its ejection outlet an ink droplet with a thickened color comprising a mixture of the color of the precolored solvent and the color produced in the coloring reaction when the ink coloring means gives the ink the predetermined stimulus depending on the information on the color component of the image to be recorded.

Further, in this apparatus the solvent may have a color of magenta, cyan, yellow or black.

Also, the present invention provides an ink-jet color recording method using ink that comprises a solvent and a plurality of kinds of small microcapsules or a plurality of large microcapsules dispersed in the solvent, each large microcapsule containing a plurality of the kinds of small microcapsules, each small microcapsule having an outer shell destroyable with a predetermined stimulus, each small microcapsule containing in a dispersed state within its outer shell one of two reactive materials that react to each other when mixed, the other of the two reactive materials being dispersed outside the outer shell of that small microcapsule in the solvent, wherein when the outer shell of that small microcapsule being destroyed with the predetermined stimulus, the two reactive materials are diffused and mixed to thereby perform a coloring reaction, the method comprising the steps of:

coloring the ink in the vicinity of an ejection outlet of an ink ejection nozzle in the coloring reaction by giving the ink in the vicinity of the ink ejection outlet a stimulus depending on information on a color component of an image to be recorded to thereby destroy the outer shells of the small microcapsules of the ink corresponding to the stimulus; and ejecting an ink droplet of the part of the ink colored in the coloring step in the vicinity of the ink ejection outlet to thereby form a color image on recording paper.

In this method, the coloring step may comprise irradiating the ink with ultrasonic waves of a predetermined frequency, and the ink droplet ejecting step may comprise heating the ink to produce film bubbles in the ink.

Also, in this method the ink droplet-ejecting step may comprise ejecting ink droplets simultaneously from a plurality of nozzles disposed in parallel.

Further, in this method the solvent may be substantially colorless, the small and large microcapsules being substantially colorless before the coloring reaction, the plurality of small microcapsules including in a mixed state a plurality of different kinds of small microcapsules producing a plurality of different colors with the corresponding predetermined stimuli in the coloring reaction.

Moreover, in this method the plurality of kinds of small microcapsules may produce colors of magenta, cyan, yellow and black, respectively.

In addition, in this method the solvent is precolored in a predetermined color, and the plurality of small microcapsules may produce the same color as the color of the solvent due to the coloring reaction;

an ink droplet with the color of the precolored solvent may be ejected through the ink ejection outlet when the coloring step gives the ink no predetermined stimulus depending on information on a color component of an image to be recorded; and an ink droplet with a thickened color comprising a mixture of the color of the precolored solvent and the color produced in the coloring reaction may be ejected through the ink ejection outlet when the microcapsules are given by the coloring step a predetermined stimulus depending on the information on the color component of the image to be recorded.

Further, the solvent may have a color of magenta, cyan, yellow or black.

Moreover, the present invention provides an ink-jet color recording apparatus using ink that comprises a solvent and a plurality of kinds of small microcapsules or a plurality of large microcapsules dispersed in the solvent, each large microcapsule containing a plurality of the kinds of small microcapsules, each small microcapsule having an outer shell destroyable with a predetermined stimulus, each small microcapsule containing in a dispersed state within its outer shell one of two reactive materials that react to each other when mixed, the other of the two reactive materials being dispersed outside the outer shell of that microcapsule in the solvent, wherein when the outer shell of that microcapsule is destroyed by the predetermined stimulus, the two reactive materials are diffused and mixed to thereby perform a coloring reaction, the apparatus comprising:

ink ejecting means having an ink ejection outlet for ejecting against recording paper an ink droplet of the ink in correspondence to information on an image to be recorded and then depositing the ejected ink droplet on the paper; and coloring means for coloring the ink droplet deposited on the paper by giving the ink droplet a predetermined stimulus depending on information on a color component of the image to thereby destroy the outer shells of a specified kind of small microcapsules selected from the kinds of small microcapsules of the ink droplet and corresponding to the stimulus.

In this apparatus, the solvent may be substantially colorless, the small and large microcapsules being substantially colorless before the coloring reaction.

Further, in this apparatus the plurality of kinds of different small microcapsules may produce colors of magenta, cyan, yellow and black, respectively.

Also, in this apparatus the predetermined stimulus may comprise ultrasonic waves and the outer microcapsule shell of each small microcapsule is destroyed with ultrasonic waves of a resonant frequency corresponding to a characteristic based on the material, thickness or diameter thereof.

Moreover, in this apparatus the coloring means may comprise an ultrasonic line head that abuts on an opposite surface of the paper from its surface on which the ink droplet was deposited and irradiates the ink droplet on the paper with ultrasonic waves emitted thereby through the paper.

Further, the present invention provides an ink-jet color recording method using ink that comprises a solvent and a plurality of kinds of small microcapsules or a plurality of large microcapsules dispersed in the solvent, each large microcapsule containing a plurality of the kinds of small microcapsules, each small microcapsule having an outer shell destroyable with a predetermined stimulus, each small microcapsule containing in a dispersed state within its outer shell one of two reactive materials that react to each other when mixed, the other of the two reactive materials being dispersed outside the outer shell of that microcapsule in the solvent, wherein when the outer shell is destroyed with the predetermined stimulus, the two reactive materials are diffused and mixed to thereby perform a coloring reaction, the method comprising the steps of:

ejecting against recording paper from an ink ejection outlet an ink droplet of the ink in correspondence to information on an image to be recorded and then depositing the ejected ink droplet on the paper; and coloring the deposited ink droplet in a desired color by giving the ink droplet deposited on the paper a predetermined stimulus depending on information on a color component of the image to thereby destroy the outer shells of a specified kind of small microcapsules selected from the kinds of small microcapsules of the ink droplet and corresponding to the stimulus.

In this method, the solvent may be substantially colorless, the small and large microcapsules being substantially colorless before the coloring reaction.

Also, in this method the plurality of kinds of different small microcapsules may produce colors of magenta, cyan, yellow and black, respectively.

Further, in this method the predetermined stimulus may comprise ultrasonic waves and the outer shell of each small microcapsule is destroyed with ultrasonic waves of a resonant frequency corresponding to a characteristic based on the material, thickness or diameter thereof.

Moreover, in this method the coloring step may comprise irradiating the ink droplet deposited on the paper with ultrasonic waves emitted by an ultrasonic line head that abuts on an opposite surface of the paper from its surface on which the ink droplet was deposited.

BRIEF DESCRIPTION OF THE DRAWINGS

These and other aspects, features and advantages of the present invention will be clarified by the following detailed description thereof when taken with reference to the accompanying drawings, in which.

DETAILED DESCRIPTION OF THE PREFERRED EMBODIMENTS

Embodiments of the present invention will be described in detail with reference to the accompanying drawings.

First Embodiment

The whole structure of a first embodiment of the present invention will be described.

Figure 1:
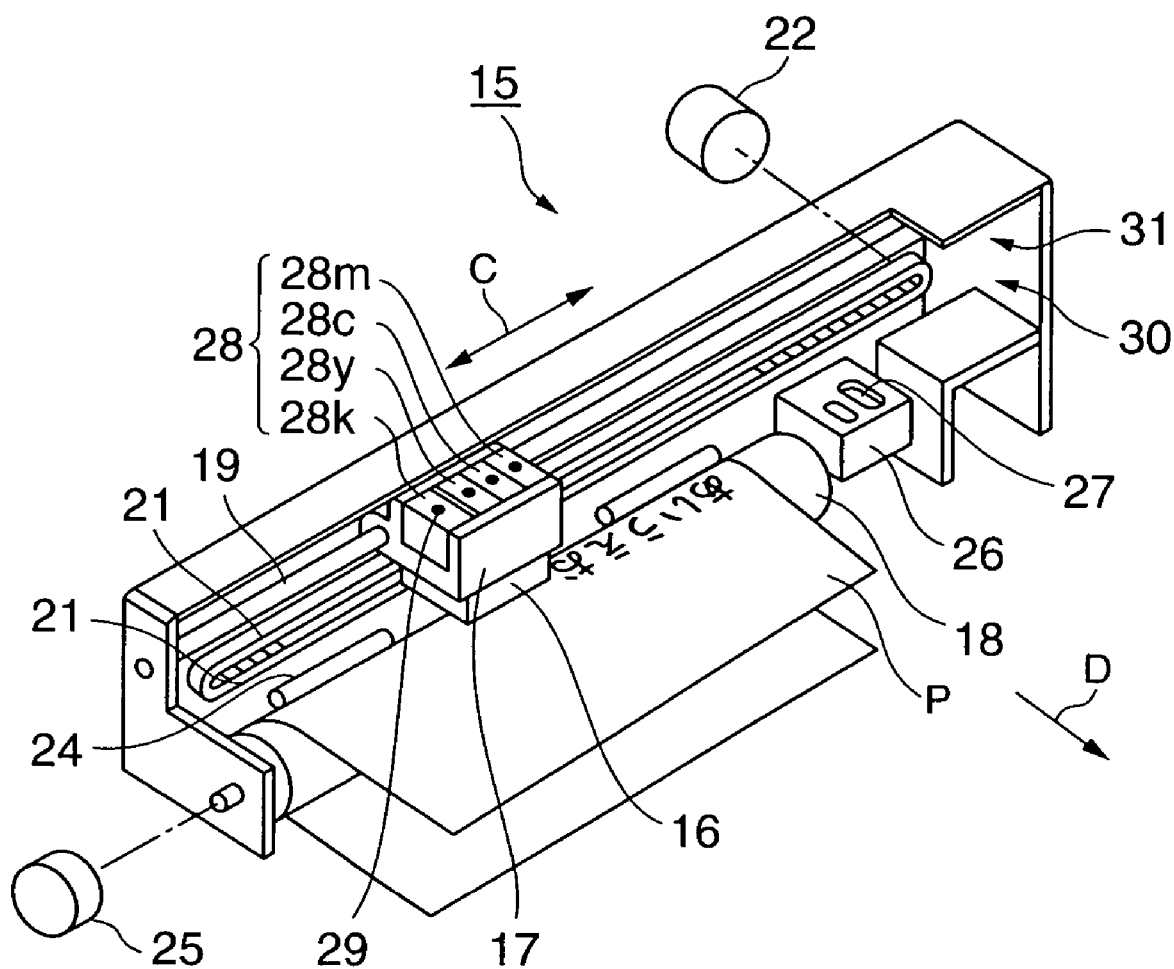
FIG. 1 is a schematic perspective view of an ink-jet recording apparatus as a first embodiment of the present invention.

FIG. 1 is a schematic perspective view of an ink-jet recording apparatus as the first embodiment. In the ink-jet recording apparatus 15 of FIG. 1, a printing head 16 is supported by a carriage 17 so as to face a platen roller 18. The carriage 17 is also supported slidable by a guide shaft 19 and engaged with a toothed belt 21, which is moved forwardly or backwardly through gears (not shown) by rotating a motor 22 forwardly or backwardly. Thus, the printing head 16 slides along the platen roller 18 in longitudinal (primary scan) directions of a double-headed arrow C on the recording paper P to thereby print characters/images on the printing paper.

Figure 26A:
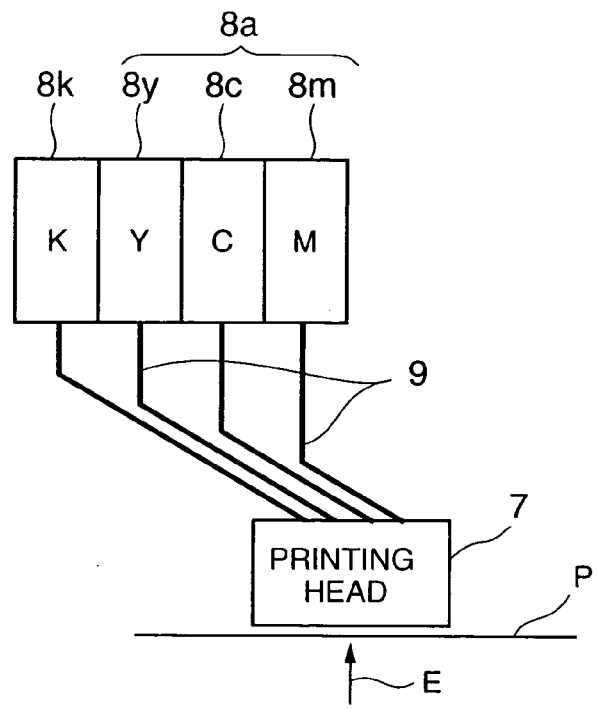
FIG. 26A schematically illustrates the composition of a main portion of the conventional ink-jet recording color printer.
Figure 26B:
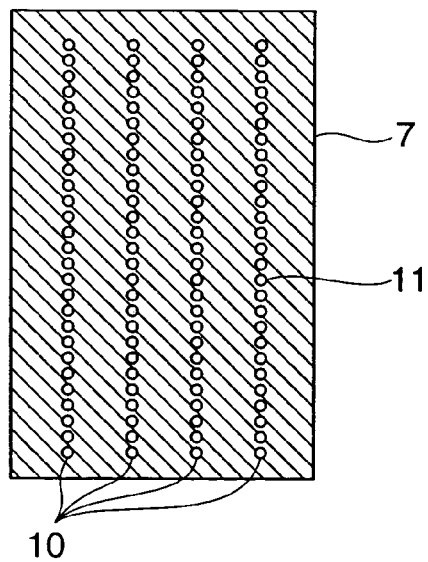
FIG. 26B is a front view of an ink ejection face of a printing head of FIG. 26A.

The platen roller 18 and auxiliary rollers 24 hold the printing paper P therebetween while intermittently conveying the recording paper P widthwise of the apparatus or in a direction of an arrow D to thereby cause the printing head 16 to print characters sequentially in lines. A head-cleaning device 26 is disposed at a right end of the platen roller 18. The head cleaning device 26 has a cleaning port 27 that faces the ink spitting face of the printing head 16 when the printing head 16 is at the right-end home position. The ink spitting face of the printing head 16 is engaged with the head-cleaning device 26 as required or periodically through the cleaning port 27 to thereby clean the ink spitting face. Thus, the blocking of the ink ejection nozzles (11 in FIG. 26B) of the printing head 16 is removed or prevented.

The carriage 17 includes removably magenta, cyan, yellow and black ink cartridges 28m, 28c, 28y and 28k that contain magenta, cyan, yellow and black ink, respectively. These cartridges 28m, 28c, 28y and 28k have ink-receiving ports 29 formed on their upper surfaces, respectively.

An ink-feeding device 43 (FIG. 7) is provided within an upper portion 31 of a space 30 to the right of the head cleaning device 26 although the ink-feeding device 43 is not shown in FIG. 1. When the carriage 17 moves to the space 30, an ink feeding pipe of the ink feeding device is connected to the ink receiving port in each of the ink-needing cartridges 28 for ink-supplementing purposes.

Inventive ink for use in the inventive ink-jet recording apparatus 15 will be described next.

Figure 2A:
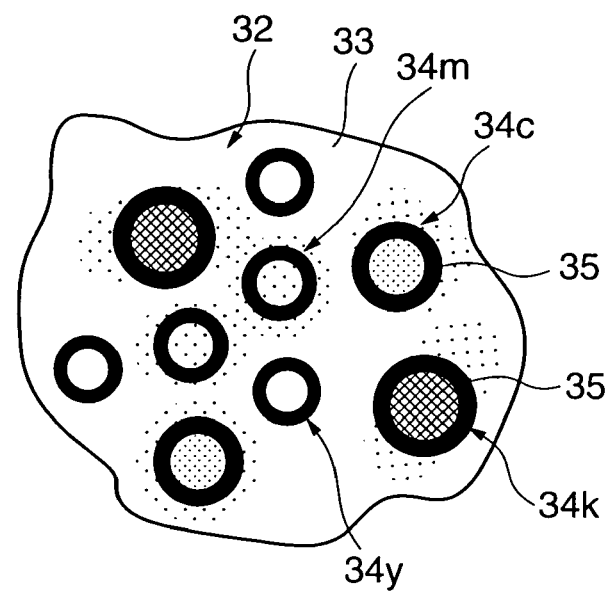
FIG. 2A illustrates the composition of ink for use in the ink-jet color recording apparatus in the first embodiment in which ink small microcapsules are dispersed in a solvent.
Figure 2B:
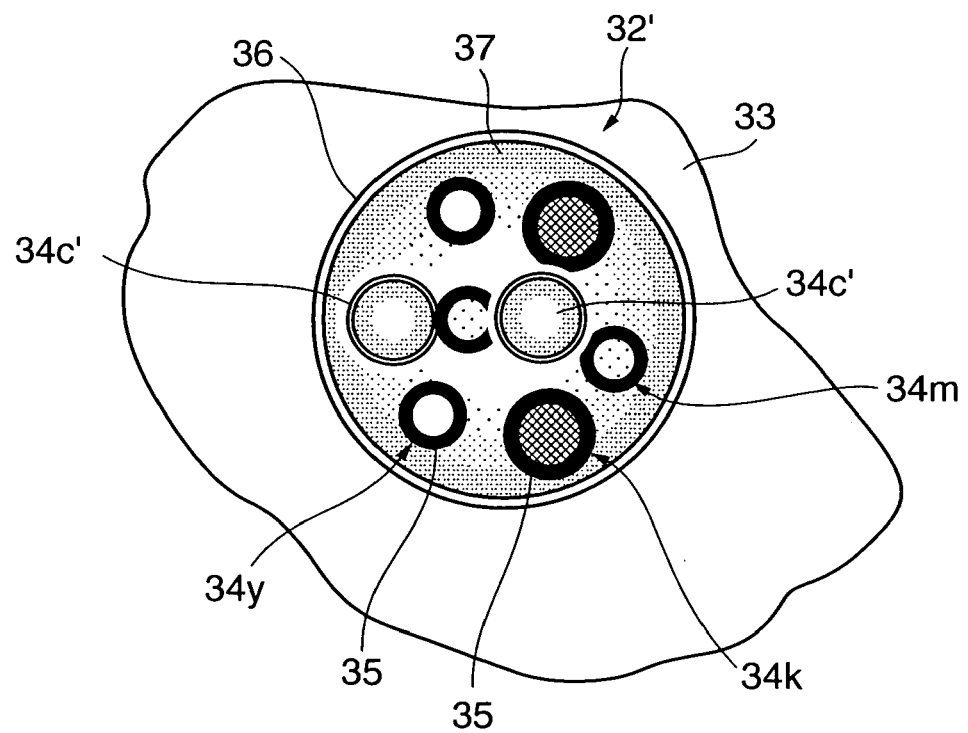
FIG. 2B illustrates the composition of a modification of the ink as the first embodiment in which modification ink small microcapsules are contained in a supporting material within each of large microcapsules dispersed in a solvent.

FIGS. 2A and 2B each illustrate the compositions of two types of inventive ink. FIG. 2A illustrates that small microcapsules are dispersed in a solvent 33 in the inventive ink. FIG. 2B illustrates a modification of the ink in which one of large microcapsules dispersed in the solvent contains small microcapsules in a supporting material thereof. In the description below, the ink points to any of the types of ink 32 and 32' of FIGS. 2A and 2B.

The ink 32 of FIG. 2A includes m (in this example 4) different kinds of small microcapsules 34m, 34c, 34y and 34k randomly dispersed in the solvent 33 and producing magenta, cyan, yellow and black, respectively. These small microcapsules 34 are surrounded by outer shells 35 destroyable with stimuli of respective different magnitudes (ultrasonic waves which will be described later in this embodiment).

As described above, the ink 32' of FIG. 2B includes large microcapsules 36 dispersed substantially uniformly in the solvent 33. Four kinds of small microcapsules 34 (34m, 34c, 34y and 34k) similar to those of FIG. 2A are dispersed randomly in a holding material 37 within each large microcapsule 36. The small microcapsules 34c' of FIG. 2B schematically illustrate that they are colored in cyan.

Any of the two types of ink 32 and 32' is colorless or white before it is colored. The small microcapsules 34 of FIGS. 2A and 2B have a diameter in a range, for example, of approximately 0.5–2 μm. The large microcapsule 36 of FIG. 2B has a diameter in a range, for example, of 5–10 μm. The number of small microcapsules 34 contained in one large microcapsule 36 is set such that a total of volumes of small microcapsules 34 contained in that large microcapsule 36 is approximately equal to that of small microcapsules 34 contained in another large microcapsule 36.

Figure 3:
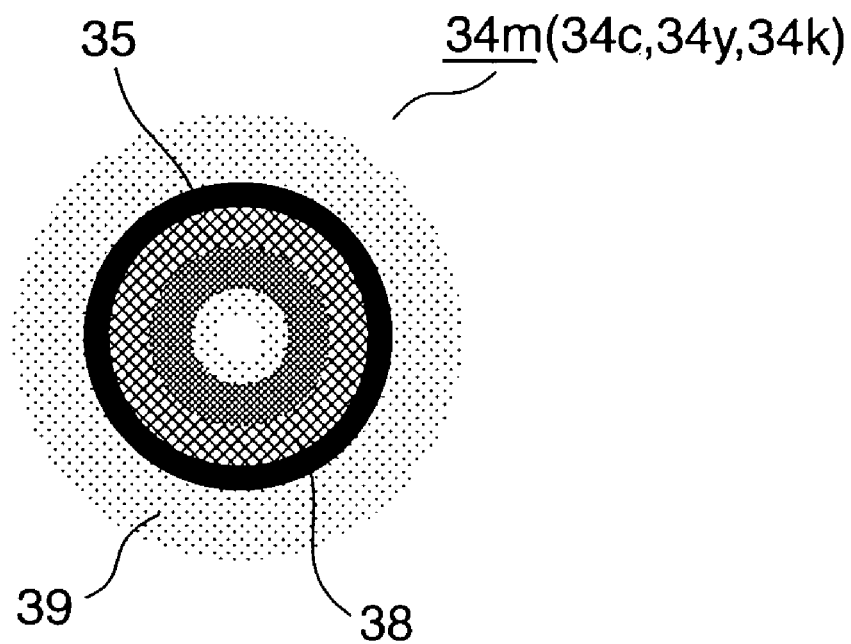
FIG. 3 illustrates the structure of the small microcapsule.

FIG. 3 illustrates the composition of each of the small microcapsules 34m, 34c, 34y and 34k. Each of these small microcapsules includes the outer shell 35 within which a color former 38 that is one of two reactive materials is contained whereas a developer 39 which is the other of the two reactive materials covers the outer shell 35.

The small microcapsules 34m, 34c, 34y and 34k are different in shell diameter, thickness and material. Thus, the resonant frequencies of the ultrasonic waves that will destroy the respective shells 35 of the small microcapsules 34m, 34c, 34y and 34k are different, and can vary accurately. For example, as the diameter of a small microcapsule increases, the resonant frequency of the ultrasonic waves decreases while as the thickness of the outer shell 35 increases, the resonant frequency increases accordingly. As the material of the shell 35 hardens, the resonant frequency increases. Thus, the respective resonant frequencies of the small microcapsules 34m, 34c, 34y and 34k are designed so as to be different from each other based on the respective factors.

Therefore, the outer shell 35 of a specified one of the four different small microcapsules 34 (for example, small cyan microcapsule 34c or 34' of FIG. 2A or 2B) is destroyed by irradiation with ultrasonic waves of a corresponding resonant frequency as a stimulus such that the color former 38 and developer 39 are diffused and mixed to thereby perform a coloring reaction.

The colored extents of the respective volumes of the small microcapsules 34m, 34c, 34y and 34k are changed depending on the corresponding quantities of ultrasonic energy irradiated. Therefore, the coloring extents of magenta, cyan and yellow can be controlled to thereby realize a free intermediate tone.

Figure 4:
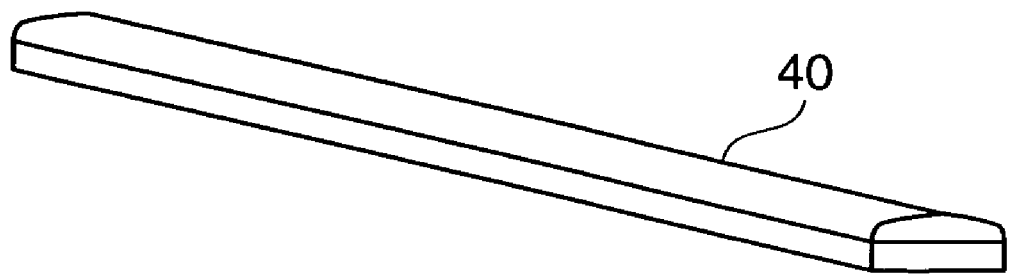
FIG. 4 is a perspective view of an ultrasonic generator, which generates ultrasonic waves used to destroy the outer shells of the small microcapsules.

FIG. 4 is a perspective view of an ultrasonic generator that generates ultrasonic waves to destroy the outer shell 35 of a small microcapsule and having a plurality of ultrasonic elements arranged over the length of the generator 40.

Figure 5A:
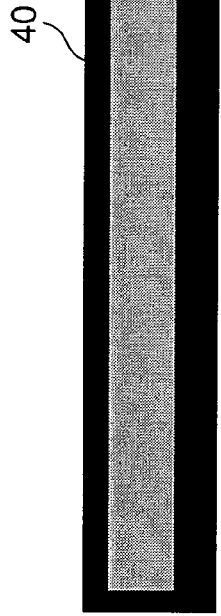
FIG. 5A is a plan view of the ultrasonic generator.
Figure 5B:
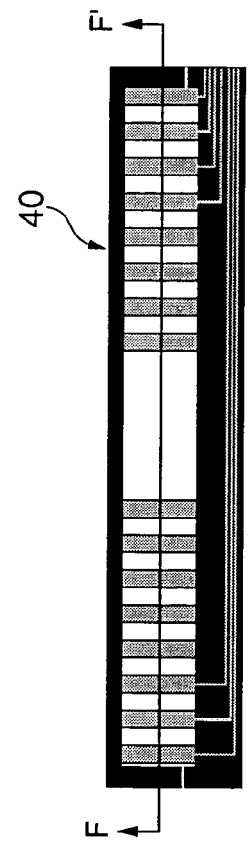
FIG. 5B is a plan view of an electrode array.
Figure 5D:
FIG. 5D is a cross-sectional view taken along a line G–G' of FIG. 5C.
Figure 5C:
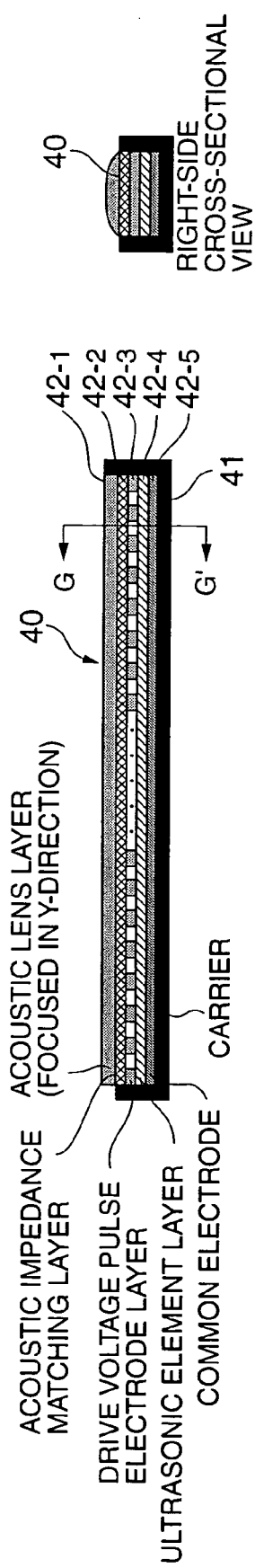
FIG. 5C is a cross-sectional view taken along a line F–F' of FIG. 5B.

FIG. 5A is a plan view of the ultrasonic generator 40. FIG. 5B is a plan view of an electrode array. FIG. 5C is a cross-sectional view taken along a line F–F' of FIG. 5B. FIG. 5D is a cross-sectional view taken along a line G–G' of FIG. 5C.

As shown in FIGS. 5C and 5D, the ultrasonic generator 40 is composed of five layers contained in a carrier 41. The lowest (fifth) layer comprises a common electrode 42-5. A fourth layer comprises an ultrasonic element layer of piezoelectric elements 42-4. A third layer comprises a plurality of strip-like electrodes 42-3 arranged in parallel in the primary scan direction. A second layer comprises an acoustic impedance matching layer 42-2 that reduces the difference in acoustic impedance between the ultrasonic element 42-4 and an ultrasonic transmission medium. A first layer comprises an acoustic lens 42-1.

The ultrasonic element layer 42-4 is connected to the electrode layer 42-3 and the common electrode 42-5 across which an ultrasonic output signals is applied to thereby generate ultrasonic waves to destroy the outer shells 35 of desired small microcapsules. When the ultrasonic element layer 42-4 receives the ultrasonic signals, it is distorted to thereby produce ultrasonic vibrations at a predetermined frequency.

The ultrasonic vibrations produced by the ultrasonic element layer 42-4 are refracted through the acoustic impedance matching layer 42-2 by the acoustic lens 42-1 and then focused on a specified position (at a specified distance).

Figure 6:
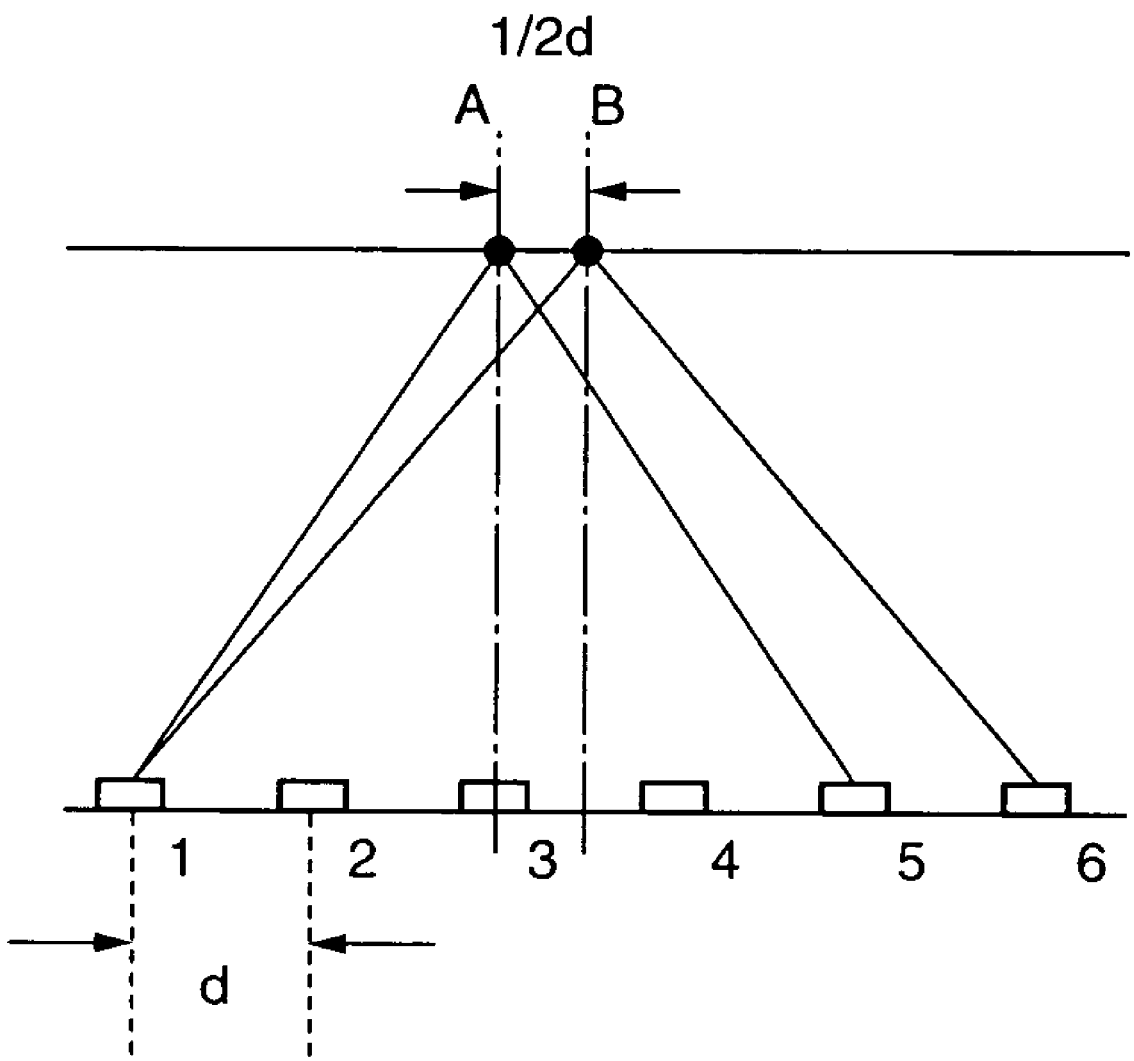
FIG. 6 is an enlarged view of a part of an arrangement of ultrasonic elements of the ultrasonic generator, illustrating its operation.

FIG. 6 illustrates a part of the arrangement of the ultrasonic element layer 42-4, for example, ultrasonic elements numbered "1"–"6" in an enlarged view. The ultrasonic elements are disposed at intervals of d, as shown. M (for example, 6) ultrasonic elements are driven in the corresponding sequential time delays. For example, a point A in FIG. 6 is irradiated with ultrasonic waves from m (for example, an odd number of "5" ultrasonic elements which are driven in the corresponding sequential time delays. For example, the distance between the point A and the ultrasonic elements "1", the distance between the point A and the ultrasonic element "2", and the distance between the point A and the ultrasonic element "3" are different little by little from one another. Based on such distance differences and the transmission velocity of the ultrasonic waves, the respective ultrasonic elements are driven to produce ultrasonic waves at respective required shifted timings to thereby irradiate the point A simultaneously with the strong focused ultrasonic waves.

By adjusting the respective timings of outputting ultrasonic waves from the ultrasonic elements, the ultrasonic waves can be focused on a position B spaced from point A by a distance (for example, ½d) less than the distance between the adjacent ultrasonic elements, d. That is, by actuating m, for example, 6 (even number) ultrasonic elements "1"–"6" in a sequentially time-delayed manner, the sequentially time-delayed ultrasonic waves can be focused on the point B facing the midpoint of the arrangement of the six ultrasonic elements. By repeating such driving of the ultrasonic elements sequentially in the direction from point A to B such that the destroying power based on the ultrasonic waves emitted by those ultrasonic elements and applied to the outer shells 35 of the small microcapsules 34 in the ink are moved in the direction from point A to B.

In addition to the coloring of the ink at points spaced from the ultrasonic elements and arranged along a line such as is shown in FIG. 6, a three-dimensional ink contained within each of nozzles of a fine diameter can be colored by destroying the outer shells of micrcocapsules in the ink with irradiation of the ultrasonic waves of the corresponding resonant frequency emitted by the ultrasonic element provided for that nozzle, as will be described later in more detail.

Figure 7:
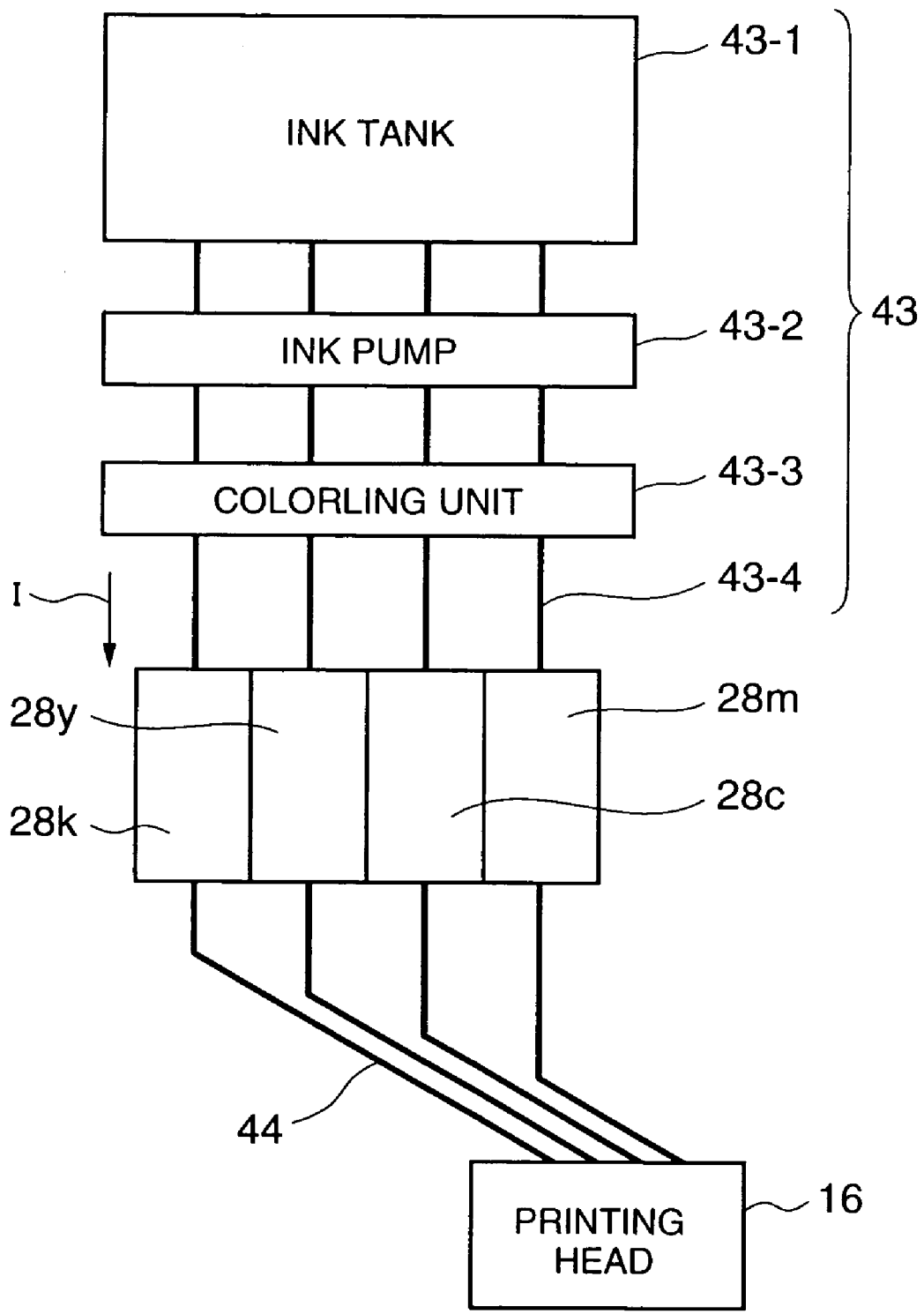
FIG. 7 schematically illustrates a color ink feeding device according to the invention provided in a space in the ink-jet recording apparatus of FIG. 1, and connected to a printing head through ink cartridges.

FIG. 7 schematically illustrates the ink feeding device 43 communicating in fluid with the printing head and provided within the upper portion 31 of the space 30 in the ink-jet recording apparatus 15 of FIG. 1, as described above. FIG. 7 also shows that the carriages 17 have moved to the ink feeding device 43 in the space 30 and that the ink feed pipes 43-4 of the ink feeding device are coupled in fluid communication to the corresponding ink inlets 29 on the upper surfaces of the ink cartridges 28.

As shown in FIG. 7, the ink feeding device 43 comprises an ink tank 43-1, an ink pump 43-2 as the ink distributing means, four ink feed pipes 43-4 and an coloring unit 43-3.

The four ink feed pipes 43-4 are coupled from the ink tank 43-1 through the ink pump 43-2 and coloring unit 43-3 to magenta, cyan, yellow and black ink cartridges 28m, 28c, 28y and 28k, respectively.

When the ink feed pipes 43-4 are coupled to the ink cartridges 28, as just described above, they are inserted into the ink inlets 29 on the tops of the ink cartridges 28 such that the ink feed pipes 43-4 communicate in fluid with the ink containing parts of the ink cartridges 28. When the ink feeding is completed and the ink feed pipes 43-4 are drawn out from the ink inlets on the ink cartridges 28, the ink inlets 29 are automatically closed.

The four ink cartridges 28 (28m, 28c, 28y and 28k) are coupled through the corresponding ink feed pipes 44 to the printing head 16.

Figure 9:
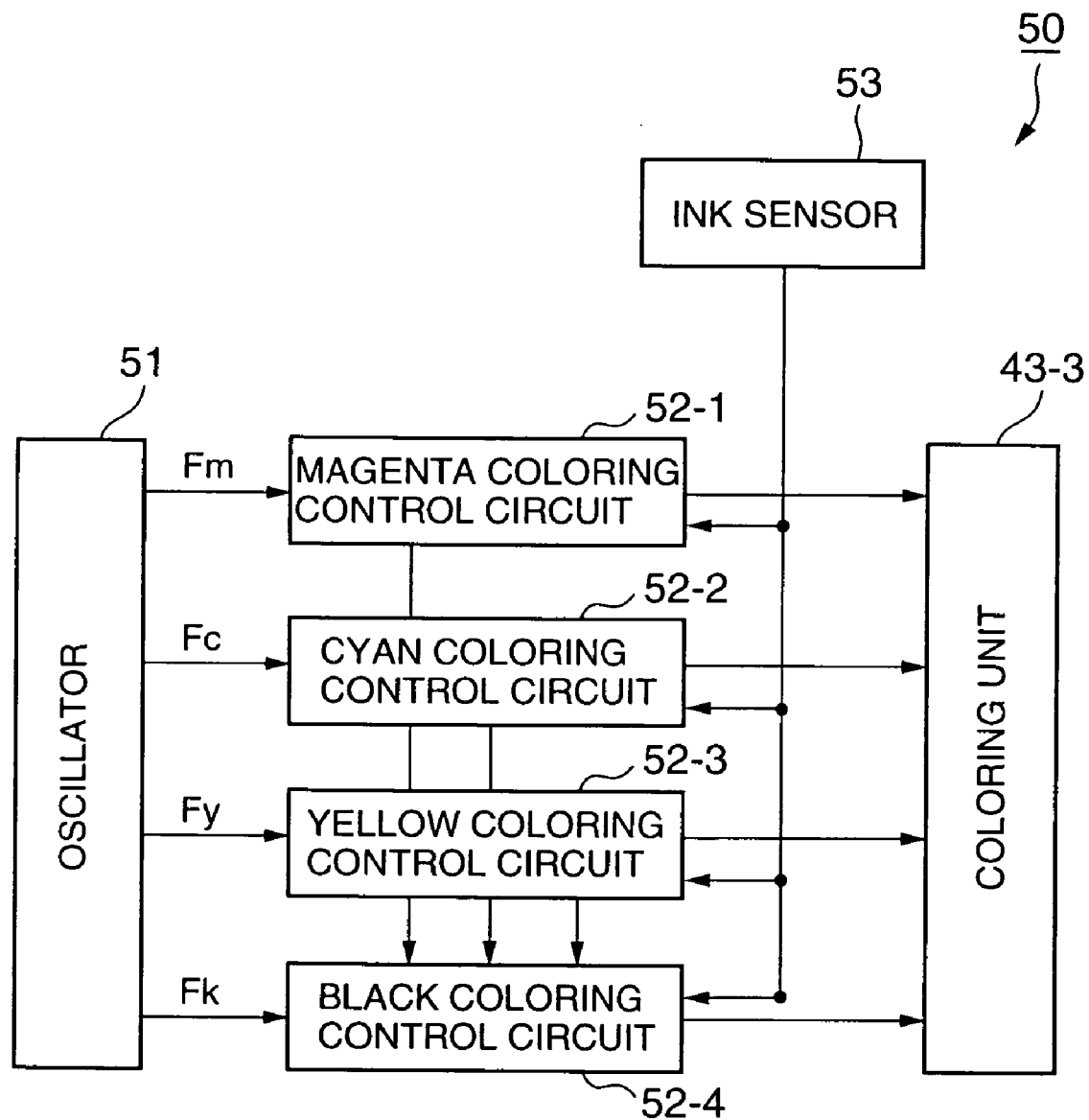
FIG. 9 is a block diagram of a driver that drives an ultrasonic generator of a coloring unit of the ink-feeding device of FIG. 7.

The ink tank 43-1 contains ink 32 of FIG. 2A (or 32' of FIG. 2B). The ink pump 43-2 feeds ink 32 (or 32') to the corresponding coloring unit 43-3 through the feed pipe 43-4 that communicates in fluid with the ink cartridge 28 indicated by the information received from an ink sensor 53 (FIG. 9). The coloring unit 43-3 irradiates the ink 32 (32') that passes through that feed pipe 43-4 with the corresponding ultrasonic waves as a stimulus to thereby produce a color corresponding to the ink color contained in the ink cartridge 28 indicated by the information. The colored ink 32 flows through the feed pipe 43-4 in the direction of an arrow I and then received in the corresponding ink cartridge 28 to thereby complete supplement of the ink.

Figure 8A:
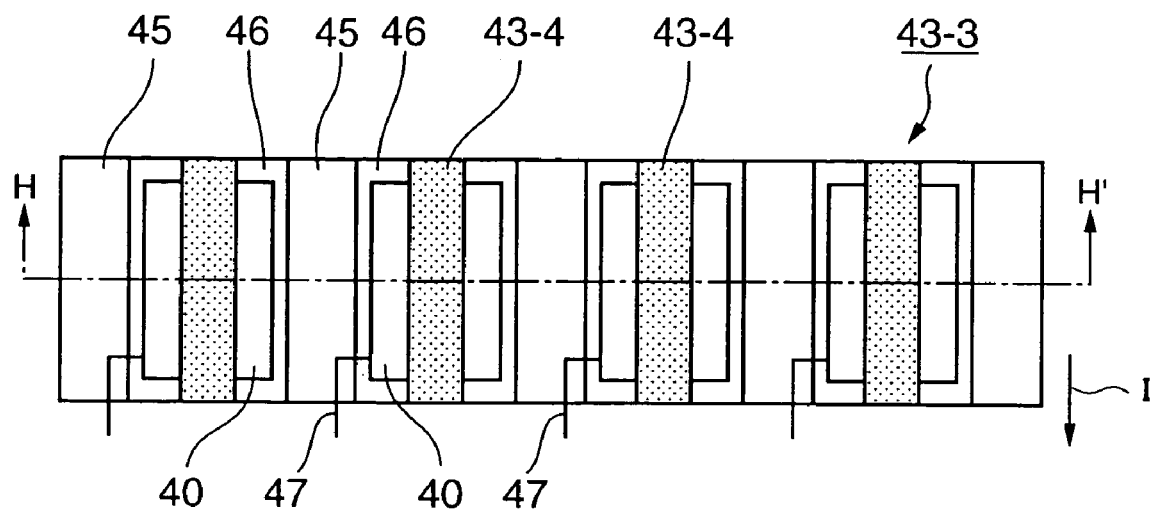
FIG. 8A illustrates the coloring unit of the ink feeding device of FIG. 7, as viewed at its front.
Figure 8B:
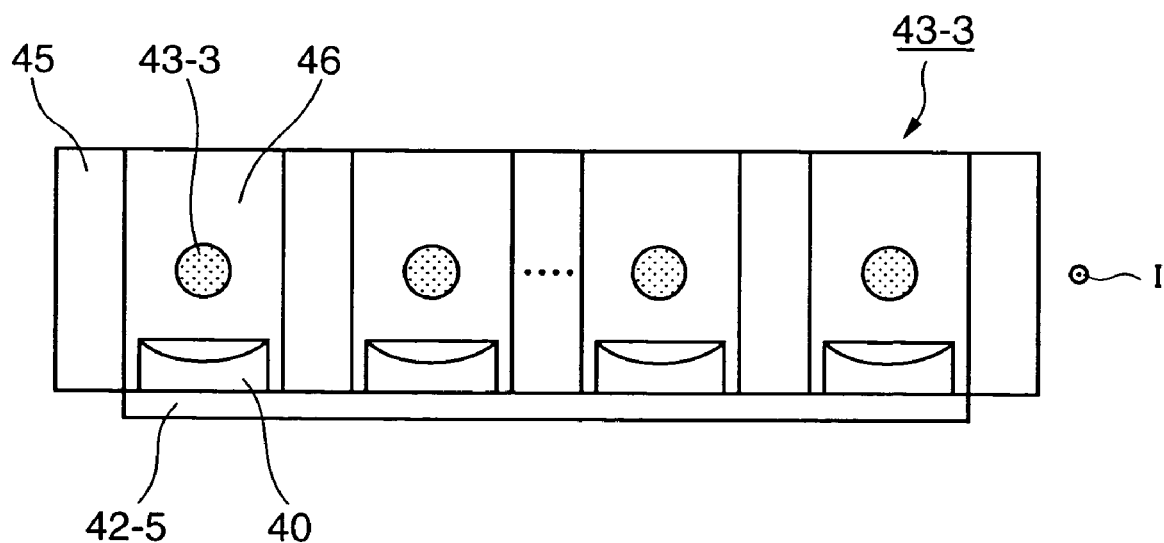
FIG. 8B is a cross-sectional view taken along a line H–H' of FIG. 8A.

FIG. 8A schematically illustrates the coloring unit 43-3 as viewed at its front. FIG. 8B is a cross-sectional view taken along a line H–H' in FIG. 8A.

An arrow and a small circle with a central black dot shown by I in FIGS. 8A and 8B indicate the direction of flow of the ink 32 (32') through each ink feed pipe 43-4 as in the arrow I in FIG. 7.

As shown in FIGS. 8A and 8B, the coloring unit 43-3 includes a plurality of coloring units 46 and ultrasonic absorbing layers 45 disposed alternately in a line with each coloring unit 46 having an ink feed pipe 43-4 extending through its center. Each ultrasonic generator 40 of FIGS. 4 and 5 is disposed behind a respective ink feed pipe 43-3 in FIG. 8A (or below a respective coloring unit 46 in FIG. 8B).

Any adjacent ink feed pipes 43-4 are isolated by an intervening ultrasonic absorbing layer 45 so that when one of the adjacent ink feed pipes 43-4 is irradiated with ultrasonic waves, the other ink feed pipe 43-4 is not colored by irradiation of possible leaking ultrasonic waves.

Each ultrasonic generator 40 has an individual electrode 47 that composes a part of the electrode layer 42-3 (FIG. 5C), as shown in FIG. 8A, and a common electrode 48 connected to the common electrode layer 42-5 (FIG. 5C), as shown in FIG. 8B. Thus, the ultrasonic generator 40 placed opposite to the ink feed pipe 43-4 corresponding to the ink cartridge 48 which will be supplemented with the ink 32 (or 32') is driven by a controller (not shown) to be described later in more detail.

FIG. 9 is a block diagram of a driver 50 that drives each ultrasonic generator 40. As shown in FIG. 9, the driver 50 includes an oscillator 51; magenta, cyan, yellow and black coloring control circuits 52-1, 52-2, 52-3 and 52-4; and the ink sensor 53. Each of the coloring control circuits 52-1, 52-2, 52-3 and 52-4 is connected to the coloring unit 43-3 of the ink feed device 43.

The oscillator 51 generates and delivers four signals of different frequencies Fm, Fc, Fy and Fk to the corresponding magenta, cyan, yellow and black coloring control circuits 52 (52-1, 52-2, 52-3 and 52-4). The ink sensor 53 senses an ink cartridge 28 whose ink has been consumed and then delivers a signal indicative of the position of that ink cartridge 28 to the respective magenta, cyan, yellow and black control circuits 52-1, 52-2, 52-3 and 52-4 in order to color the ink in the ink feed pipe 43-4 corresponding to the ink-lacking cartridge 28. Then, in response to the signal the appropriate coloring control circuit is actuated to send a drive signal to the coloring unit 43-3 that then colors the ink in the ink feed pipe 43-4 corresponding to the ink-lacking cartridge 28.

The coloring unit 43-3 responds to the drive signal from that coloring control circuit to drive the ink pump 43-2 corresponding to the ink feed pipe 43-4 that in turn corresponds to the ink lacking cartridge 28 to thereby feed the ink 32 (32') in that ink feed pipe 43-4 in a direction of the arrow I of FIGS. 8A and 8B or to the coloring unit 43-3 of the ink feeding device 43.

Substantially simultaneously with the driving of the ink pump 43-2, the actuated coloring control circuit 52 delivers an electric signal of the corresponding frequency (Fm, Fc, Fy or Fk) from the oscillator 51 to the coloring unit 43-3. An ultrasonic generator 40 of the coloring unit 43-3 corresponding to the electric signal then generates ultrasonic waves of the resonant frequency (Fm, Fc, Fy or Fk) corresponding to that ink feed pipe 43-4 and irradiates that ink feed pipe 43-4 with a focused form of the ultrasonic waves.

Thus, the outer shells 35 of the selected small microcapsules 34 of interest in the ink 32 (or 32') that flows through that ink feed pipe 43-4 are destroyed such that the color formers 38 within the outer shells mix and react with the developers 39 outside the outer shells to color the ink in the corresponding color. The colored ink is then fed through the ink feed pipe 43-4 to the corresponding cartridge 28.

Second Embodiment

Figure 10:
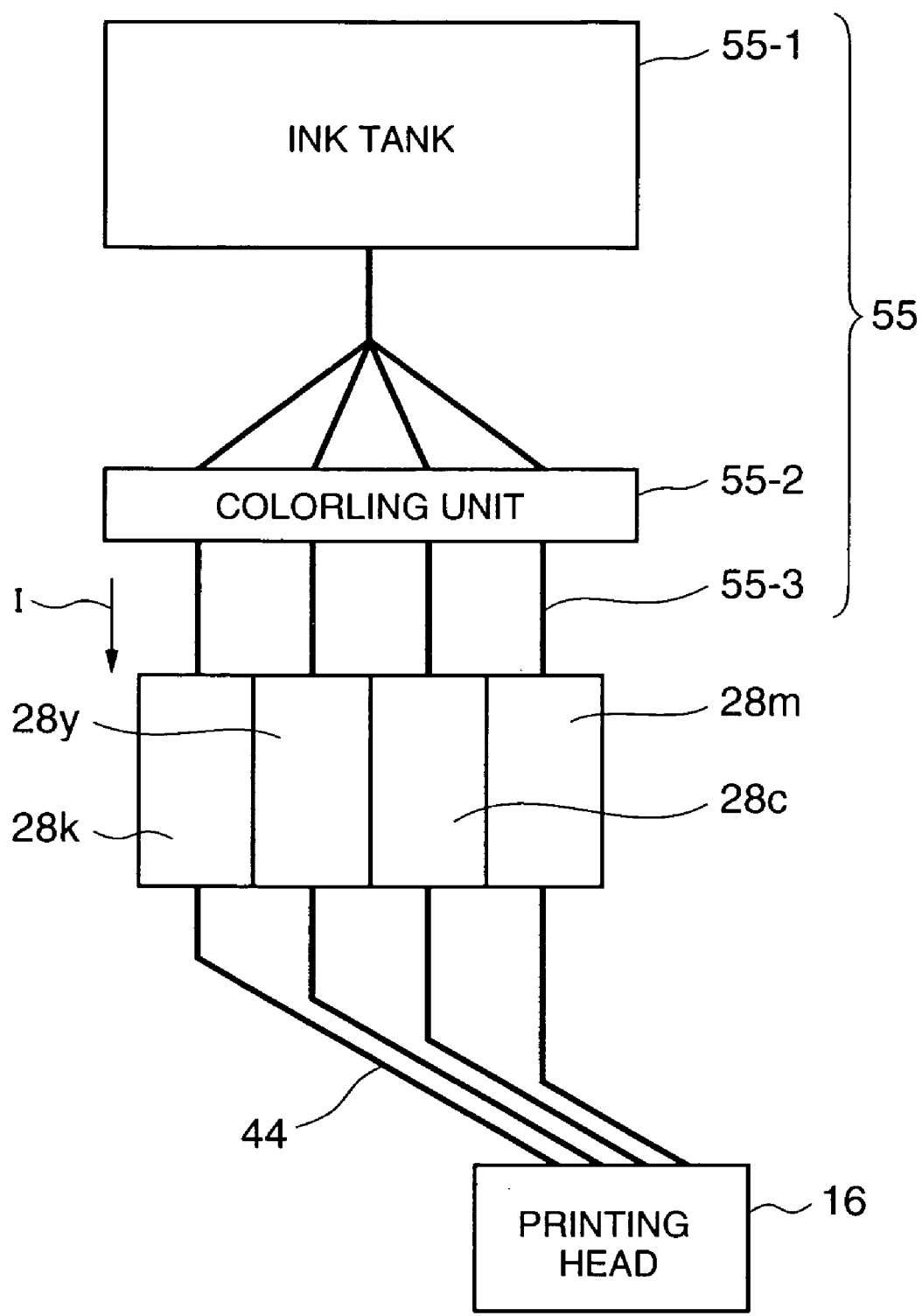
FIG. 10 schematically illustrates an ink-feeding device of a second embodiment connected to the printing head through cartridges.

FIG. 10 schematically illustrates an ink feeding apparatus of a second embodiment connected to a printing head 16.

Also, in this case an ink feeding device 55 shown in FIG. 10 is provided within the same upper portion 31 of the space 30 as in the ink jet recording apparatus 15 of FIG. 1 as in FIG. 7. FIG. 10 also illustrates that the same carriage 17 as in FIG. 1 has moved to the ink feed device 55 to feed the ink into the ink cartridges 28 and the fixed ink feed pipes 55-3 of the ink feeding device are coupled to the ink inlets 29 on the upper surfaces of the ink cartridges 28 so as to be in fluid communication with the inlets 29.

As shown in FIG. 10, the ink feeding device 55 includes an ink tank 55-1 as ink containing means, a coloring unit 55-2 as ink distributing means and coloring means, and four ink feed pipes 55-3. An arrow I shown indicates the direction of flow of ink 32 through the ink feed pipes 55-3.

Figure 11A:
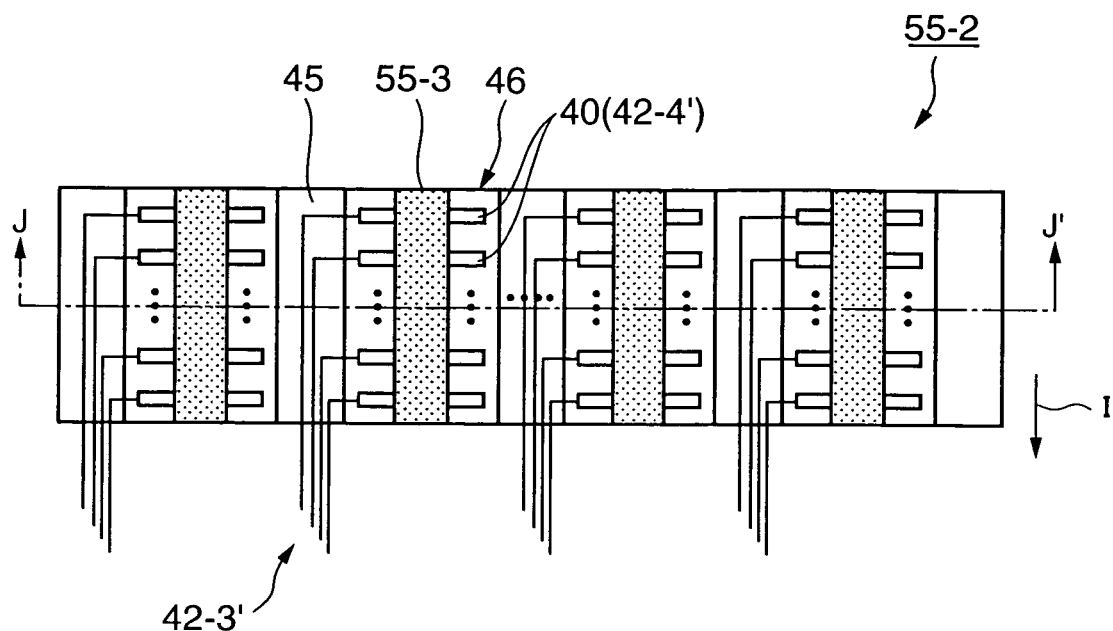
FIG. 11A schematically illustrates a coloring unit of the ink-feeding device of FIG. 10, as viewed at its front perspectively.
Figure 11B:
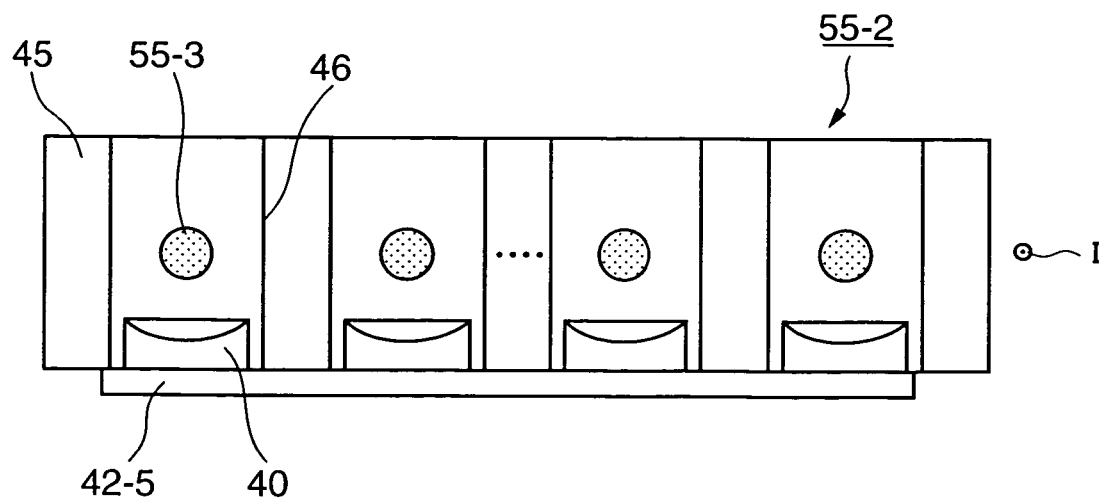
FIG. 11B is a cross-sectional view taken along a line J–J' of FIG. 11A.

FIG. 11A schematically illustrates the front of the coloring unit 55-2 prospectively. FIG. 11B is a cross-sectional view taken along a line J–J' in FIG. 11A.

An arrow and a circlet with a central dot shown by I in FIGS. 11A and 11B indicate the direction of flow of the ink 32 (32') through the ink feed pipe 55-3 as in the arrow I in FIG. 10. The same reference numeral is used to identify the same element in FIGS. 11A, 11B and 8A, 8B.

As shown in FIGS. 11A and 11B, the coloring unit 55-2 includes a plurality of coloring units 46 and ultrasonic absorbing layers 45 disposed alternately in a line with each ink feed pipe 55-3 extending through substantially the center of the corresponding coloring unit 46. Each ultrasonic generator 40 identical to that of FIGS. 4 and 5 is disposed behind the corresponding one of the ink feed pipes 55-3 for the coloring unit 46 in FIG. 11A (down in FIG. 11B) so that the generator 40 faces the corresponding ink feed pipe 55-3.

The coloring unit 55-2 of FIGS. 11A and 11B is different in structure from the coloring unit 43-3 of FIGS. 8A and 8B in that as shown in FIG. 11A, ultrasonic elements 42-4' and the corresponding electrodes 42-3' of each ultrasonic generator 40 are disposed along a respective one of the ink feeding pipes 55-3 and the electrodes 42-3' are connected to the corresponding coloring control circuits 52 of FIG. 9. Thus, as shown in FIG. 6, the respective ultrasonic elements of the ultrasonic oscillator 40 are driven in a sequentially time-delayed manner such that a focusing position of ultrasonic waves generated moves in the direction of flow of the ink 32 (32') shown by an arrow I along the axis of the ink feed pipe 55-3 to thereby irradiate the ink feeding pipe. That is, only one fixed position is not irradiated with the ultrasonic waves as shown in FIGS. 7 and 8.

Figure 12:
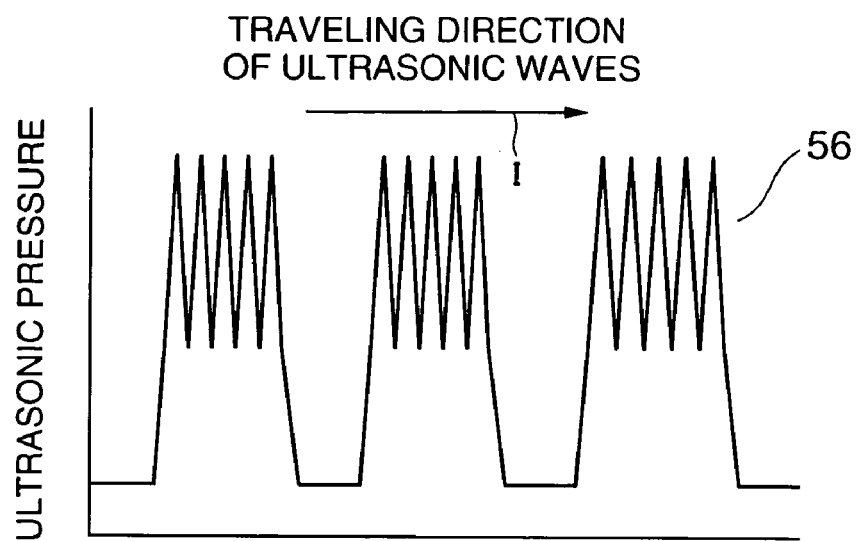
FIG. 12 schematically illustrates that in the second embodiment progressive ultrasonic waves are produced sequentially due to sequential time delay operation of the ultrasonic elements and travel to sequential focusing positions.

FIG. 12 schematically illustrates that focused progressive ultrasonic waves are produced by driving the respective ultrasonic elements in a sequentially time-delayed manner to thereby travel in the direction of an arrow I (similar to that of FIGS. 10, 11A, 11B). The horizontal and vertical axes represent time and ultrasonic pressure, respectively.

Thus, the ink 32 (32') is colored and moved by the pressure of the ultrasonic waves through the ink feed pipe 55-3 in the progressing direction of the ultrasonic waves shown by the arrow I, that is, toward the ink cartridge 28 without using an independent ink pump.

While in the embodiment one kind of ink containing small four-different-colored microcapsules has been described, the present invention is not limited to this particular case. For example, ink containing small three-different-colored (magenta, cyan and yellow) microcapsules may be used instead. Conventional general black ink may be used for black printing.

While in the embodiment the ink tank, ink pump, feed pipe paths and coloring unit are illustrated as provided in the space 30 at the right end of the printer, the present invention is not limited to this particular case. For example, the feed pipe paths may be integral with the coloring unit while the ink tank and ink pump (when the ink is fed by the coloring unit, the ink tank only is used) may be provided on the space 30.

As described above, since one kind of ink can be processed so as to provide four different types of color ink in the first and second embodiments, the color ink-jet recording device where management of the ink is easy is provided. The color ink-jet recording device is reduced in size by using a unit that combines the coloring and ink-feeding functions, as described above.

Third Embodiment

Figure 13A:
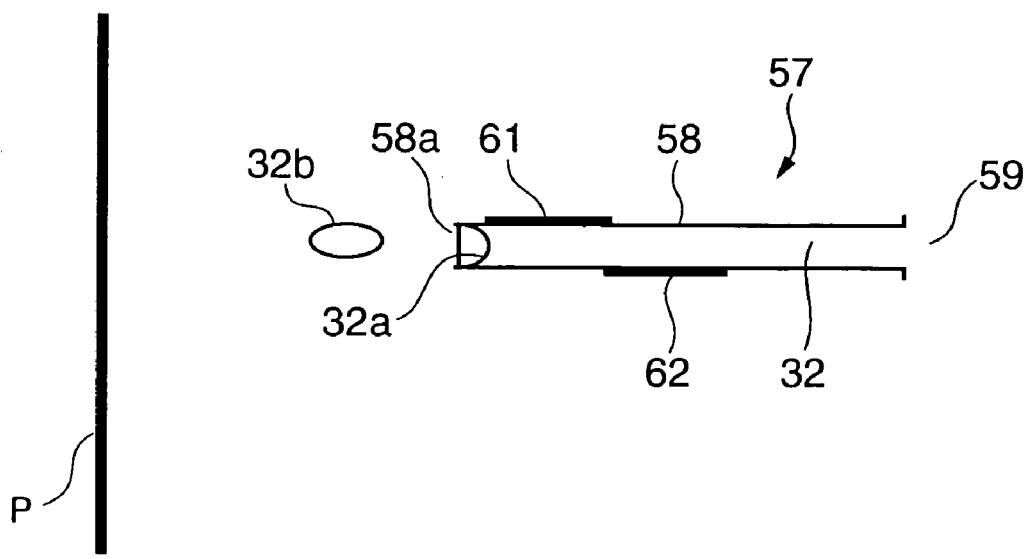
FIG. 13A schematically illustrates the composition of a recording head as a main element of an ink-jet color recording apparatus as a third embodiment, and its printing operation as well.
Figure 13B:
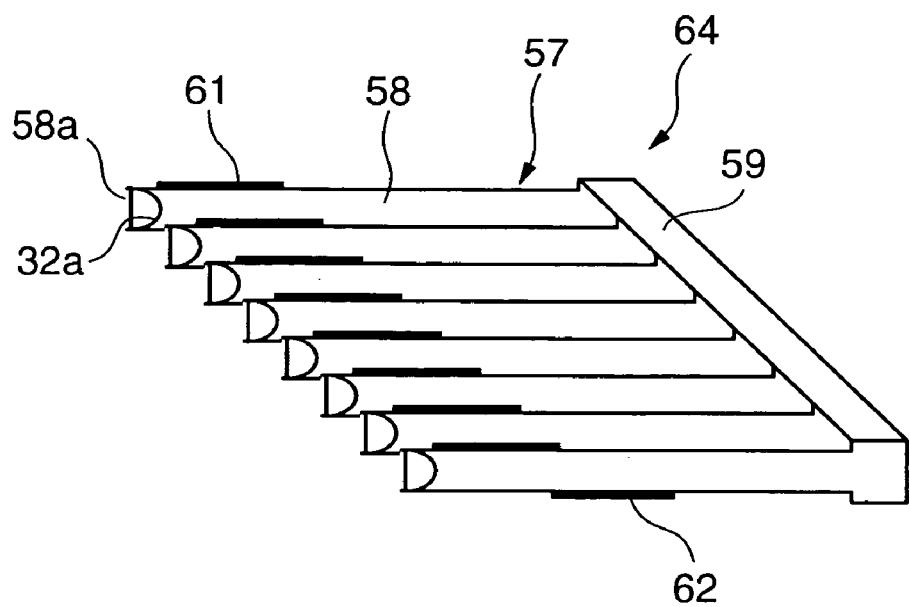
FIG. 13B illustrates a modification of the third embodiment.

FIG. 13A schematically illustrates a recording head that is a main portion of an ink jet color recording apparatus as a third embodiment, and its printing operation. FIG. 13B illustrates a modification of the third embodiment.

The recording head 57 of FIG. 13A includes an ink ejection nozzle 58, an ink tank 59, an ultrasonic element 61 and a heater 62. The ink tank 59 is connected to a rear (right in FIG. 13A) end of the ink ejection nozzle 58. The ink tank 59 contains ink 32 (or 32') that in turn contains the same microcapsules as in FIGS. 2A and 2B for use in the ink-jet color recording apparatus. The ink 32 (or 32') is fed from the ink tank 59 to the ink ejection nozzle 58 such that the ink ejection nozzle 58 is always filled with the ink to thereby form a meniscus 32a at an ejection outlet 58a in the nozzle 58.

The ultrasonic element 61 is disposed on a top of the ink ejection nozzle 58 immediately after its ejection outlet 58a. The heater 62 is disposed immediately after the ultrasonic element 61 on its lower surface. The ultrasonic element 61 and the heaters 62 are connected through drive electrodes (not shown) to an ultrasonic element driver (not shown) and a heater driver (not shown), respectively, of a controller (not shown).

The ink ejection nozzle 58 of the recording head 57 ejects a colored ink droplet 32b from its ejection outlet 58a, as will be described in more detail later. The ejected ink droplet 32b hits against recording paper P at a predetermined position to thereby color the paper P in a dot area of a predetermined size (usually, size of one pixel) in a specified color.

In this way, as the ink ejection nozzle 58 and the printing paper P are moved in the primary and secondary directions by a moving device (not shown) to thereby print characters and/or images in desired colors on the printing paper P.

FIG. 13B illustrates a line head 64 including an array of parallel-arranged ejection nozzles 58 each of which is identical to the recording head 57 of FIG. 13A. The ultrasonic elements 61 are connected through the corresponding drive electrodes (not shown) and the common electrode (not shown) to an ultrasonic element driver (not shown) of the controller. The heaters 62 are likewise connected through the corresponding drive electrodes (not shown) and the common electrode to a heater driver (not shown) of the controller. In this arrangement, the printing speed is increased because of provision of the plurality of ink ejection nozzles 58 to thereby improve the working efficiency accordingly.

Figure 14A:
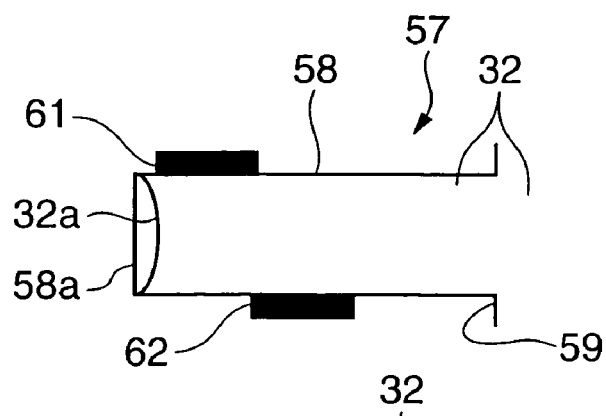
FIGS. 14A, 14B, 14C, 14D, 14E and 14F cooperatively illustrate that a colored ink droplet is spit out from a nozzle of a recording head in the third embodiment.
Figure 14B:
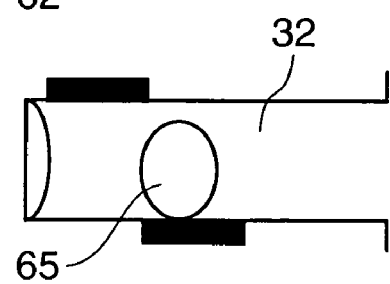

FIGS. 14A–14F cooperatively illustrate ejection of a colored-ink droplet from the ink ejection nozzle 58. FIG. 14A is an enlarged view of the recording head of FIG. 13A.

In FIG. 14A, first, the heater 62 is supplied with an electric signal indicative of image information from the controller to produce the corresponding heat. This produces over the heater 62 within the nozzle 58 minute bubbles, which are then united to become a large film bubble 65 of FIG. 14B.

Figure 14C:
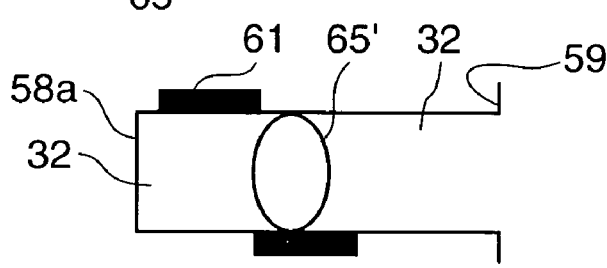

As shown in FIG. 14C, the film bubble 65 grows into a much greater one 65' due to thermal expansion to thereby separate the ink 32 that contains microcapsules within the ejection nozzle 58 into those on the sides of the ink ejection outlet 58a and the ink tank 59.

Figure 14D:
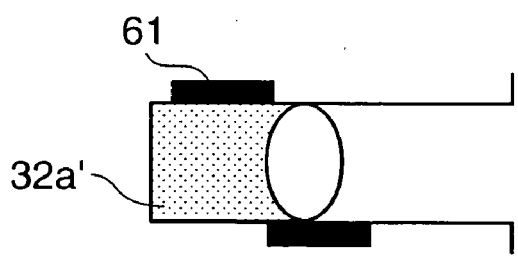

In synchronism with this timing, the ultrasonic element 61 is driven with an electric signal indicative of the image information from the controller to thereby irradiate the ink 32 that contains the microcapsules on the side of the ink outlet 58a with the ultrasonic waves of a predetermined wavelength. Thus, as shown in FIG. 14D the ink 32 that contains microcapsules on the side of the ink outlet 58a is colored in a predetermined color, as shown by 32a'.

Figure 14E:
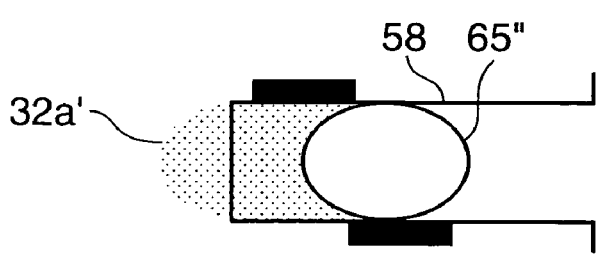

Then, the film bubble 65' grows into a further large one 65" and its pressure protrudes the colored ink 32a' partially outward from the ink ejection outlet 58a, as shown in FIG. 14E.

Figure 14F:
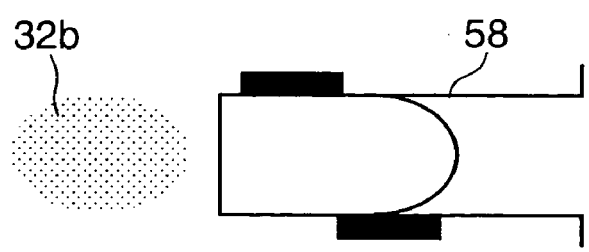

Then, as shown in FIG. 14F, the film bubble 65' further grows and its pressure causes the ink to be ejected as a droplet 32b from the ejection nozzle 58 against the recording paper P, as shown in FIG. 13A. Thereafter, the film bubble rapidly shrinks and disappears. Thus, the situation returns to that of FIG. 14A. This period of operation is not more than approximately 300 μsec.

As described above, according to the ink jet color recording apparatus of this embodiment, one kind of microcapsule-containing ink contained in a single ink tank is used, and the ink ejection nozzle itself colors the microcapsule-containing ink in a desired color while ejecting the ink droplets against the recording paper. Therefore, a handy color-ink jet recording apparatus is provided that is simple in structure and requires no management of each type of color ink.

Fourth Embodiment

Figure 15A:
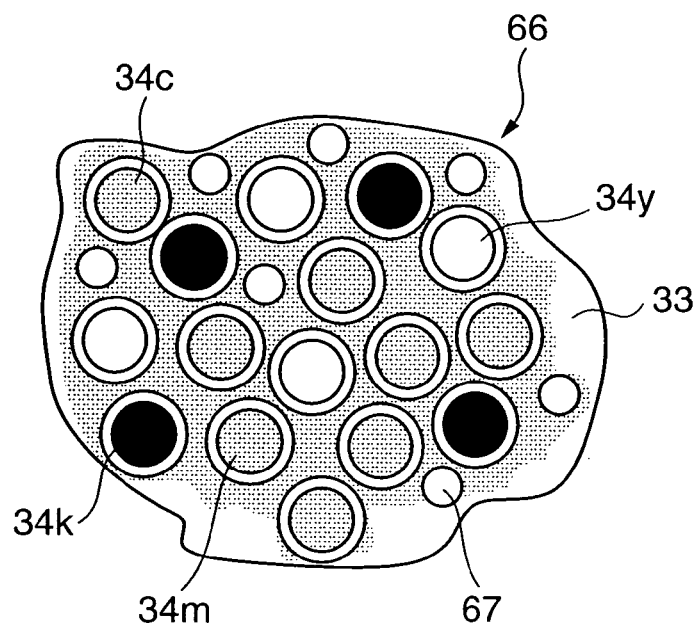
FIGS. 15A and 15B each illustrate the compositions of two types of ink containing microcapsules for security printing purposes as a fourth embodiment.
Figure 15B:
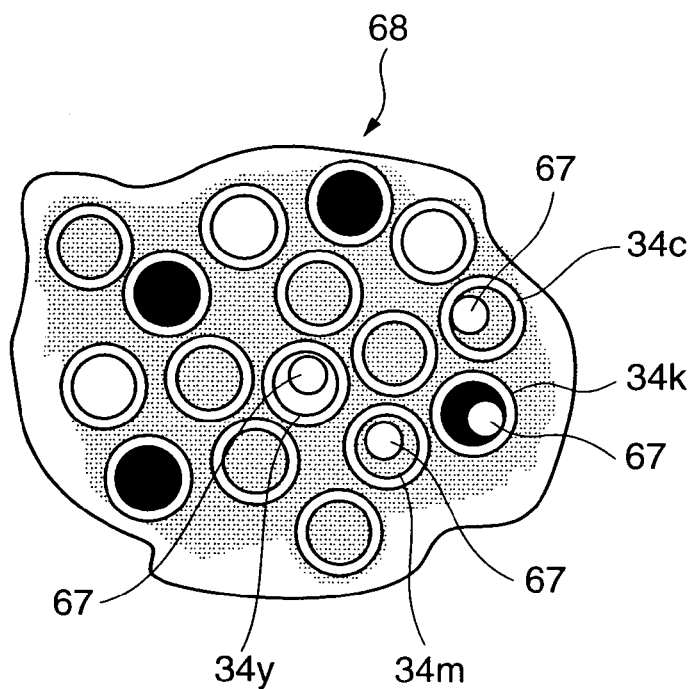
Figure 17A:
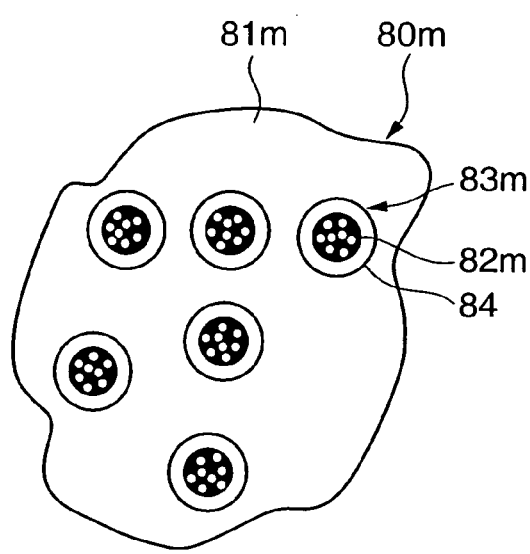
FIGS. 17A, 17B, 17C and 17D illustrate the compositions of four types of ink, respectively, as a fifth embodiment for use in an ink-jet color recording apparatus.
Figure 17B:
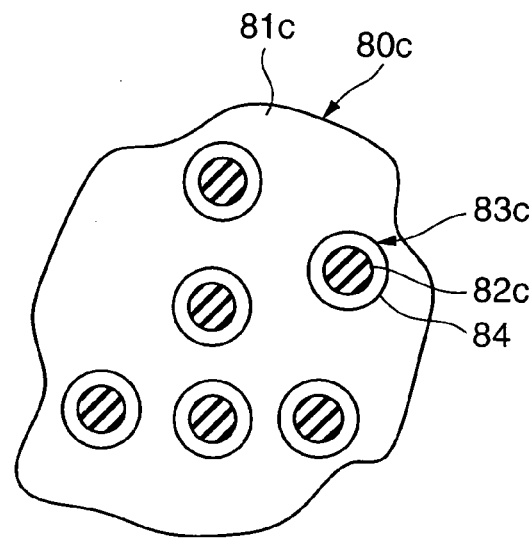
Figure 17C:
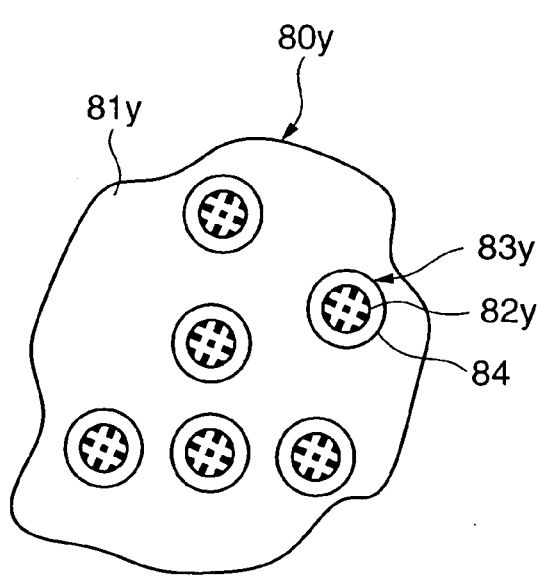
Figure 17D:
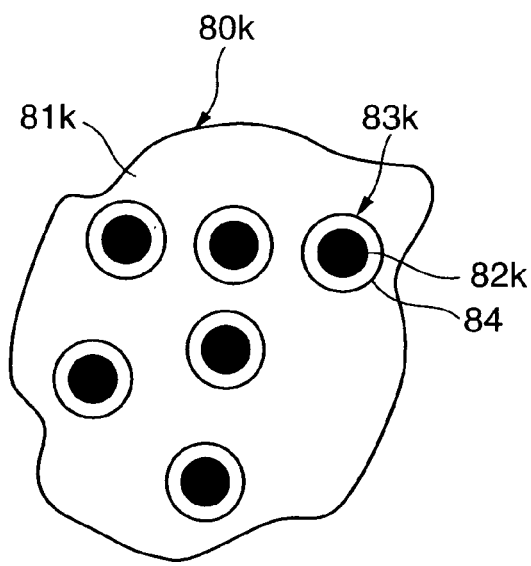

FIGS. 15A and 15B illustrate the composition of ink for use in the ink-jet color recording apparatus as a fourth embodiment, and especially containing microcapsules for security printing.

The ink 66 of FIG. 15A contains small microcapsules 34 (34m, 34c, 34y and 34k) of the same kind as is shown in FIG. 2A and fluorescent materials 67 for security printing dispersed in a solvent 33 that also function as a supporting material containing a developer.

The ink 68 that contains microcapsules for security printing of FIG. 15B contains security printing fluorescent materials 67 contained respectively in the small microcapsules 34 (34m, 34c, 34y and 34k) of the ink 32 of the same kind as is shown in FIG. 2A. In this case, the fluorescent materials 67 may be contained in the small microcapsules 34 of any one, some or all of the four colors or in some of the small microcapsules 34 of the same color. In that case, the solvent 33 may also contain the security printing fluorescent materials 67.

Any of the two types of inks 66 and 68 of FIGS. 15A and 15B may be used in the ink jet recording apparatus 15 of FIG. 1, and may be used for security printing with the recording head 57 or line head 64 of the ink jet color recording apparatus of FIG. 13A or 13B.

Figure 16:
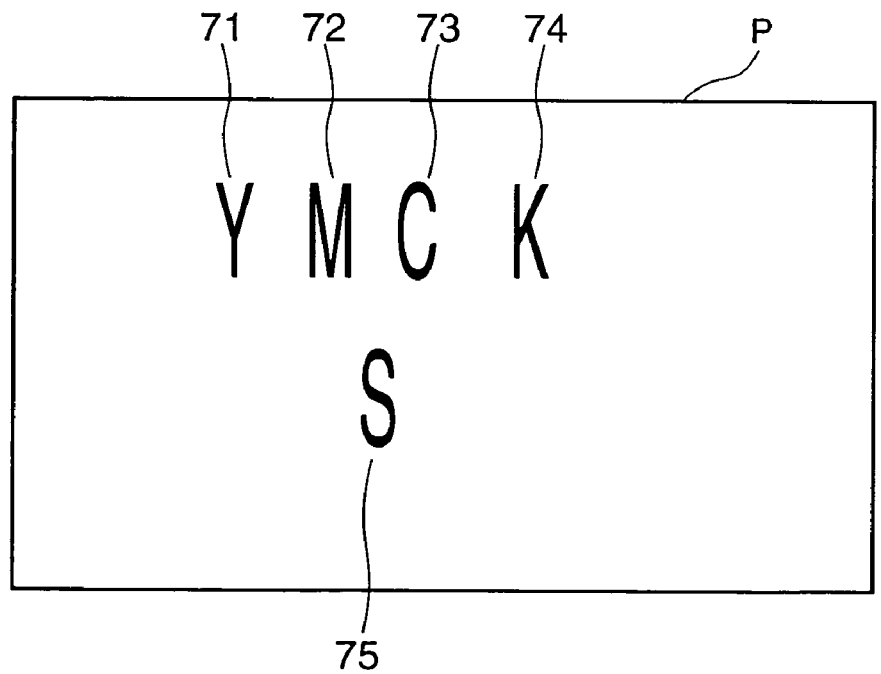
FIG. 16 illustrates a security print obtained with the ink containing microcapsules for security printing in the fourth embodiment.

FIG. 16 illustrates security printing performed using the ink 66 or 68 containing the security printing microcapsules. As shown in FIG. 16, yellow, magenta, cyan and black characters Y, M, C and K 71, 72, 73 and 74 are printed on the recording paper P. An invisible character S 75 (shown by a broken line in FIG. 16) is printed below the characters Y, M, C and K in uncolored ink without driving the ultrasonic generator 40 or elements 61.

The colors of yellow, magenta, cyan and black are illustrated as an example and any other colors and their intermediate colors may be used, of course.

When the printing on the paper of FIG. 16 is performed by using the ink 66 or 68 containing microcapsules for security printing shown in FIG. 15A or 15B, not only the character S but also the characters Y, M, C and K on a print of FIG. 16 become visible even in a dark place when the print is irradiated with ultraviolet rays because the fluorescent materials contained within and/or outside the microcapsules in the ink become luminous.

Thus, security by hidden characters and/or security of copy inhibition are maintained.

Fifth Embodiment

FIGS. 17A–17D illustrate the compositions of four types of ink for use in the ink jet color recording apparatus as a fifth embodiment.

The four types of ink 80 (80m, 80c, 80y and 80k) of FIGS. 17A–17D are the same in composition except in color. More particularly, magenta ink 80m of FIG. 17A includes small microcapsules 83m each containing magenta color formers 82m of a general concentration dispersed randomly in a solvent 81m colored in light magenta. Cyan ink 80c of FIG. 17B includes small microcapsules 83c each containing cyan color formers 82c of a general concentration dispersed randomly in a solvent 81c colored in light cyan. Yellow ink 80y of FIG. 17C includes small microcapsules 83y each containing yellow color formers 82y of a general concentration dispersed randomly in a solvent 81y colored in light yellow. Black ink 80k of FIG. 17D includes small microcapsules 83k containing black color formers 82k of a general concentration dispersed randomly in a solvent 81k colored in light black. That is, in the four types of ink 80 of this embodiment the ink solvents 81 (81m, 81c, 81y and 81k) are colored in the respective predetermined colors beforehand.

The small microcapsules 83 (83m, 83c, 83y and 83k) are similar in structure to that of the small microcapsule 34 of FIG. 3, and have outer shells 84 destroyable by ultrasonic waves of the same resonant frequency. These microcapsules 83 also have the same diameter in a range, for example, of approximately 0.5–2 µm.

Thus, when the ink 80 of this embodiment is not irradiated with ultrasonic waves of a predetermined resonant frequency as a stimulus, it has the same light color ink as the beforehand colored solvent 81. The outer shell 84 of each of the microcapsules 83 contained in any ink 80 is destroyed by irradiation with the ultrasonic waves of the predetermined resonant frequency, so that the color former 38 and the developer 39 (FIG. 3) present within and outside the microcapsule are dispersed and mixed to thereby produce a color thicker than the beforehand given or original color of the solvent. This produced color is further mixed with the original color of the solvent 81 to thereby provide thicker colored ink.

Figure 18A:
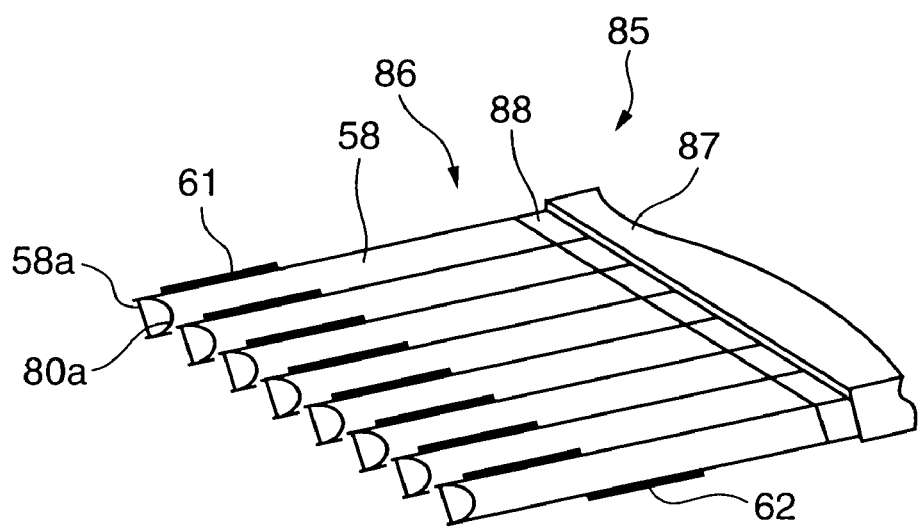
FIG. 18A is a perspective view of a recording head as a main portion of the ink-jet color recording apparatus using each of the types of ink of FIG. 17.
Figure 18B:
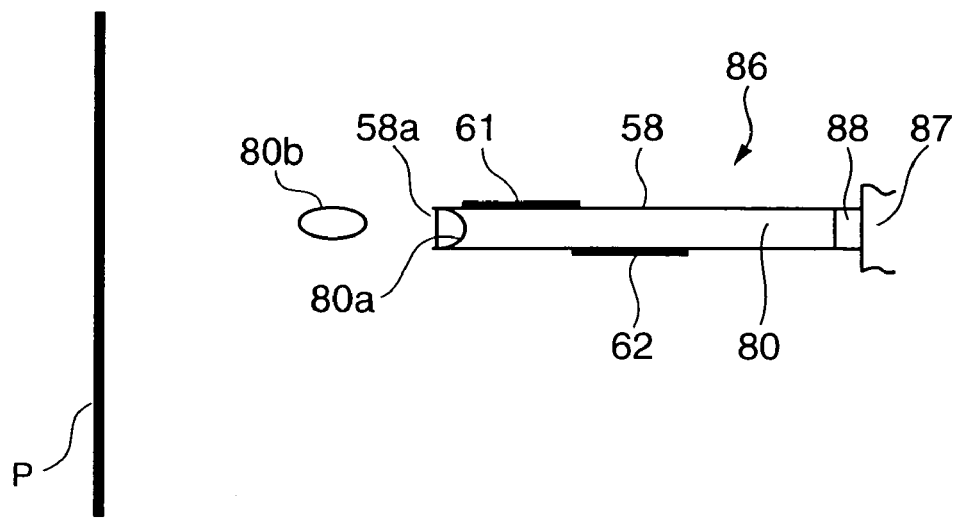
FIG. 18B is a side view of the structure of each ink ejection nozzle of FIG. 18A, illustrating its printing operation schematically.

An inventive ink-jet color recording apparatus using the inventive ink 80 of this embodiment will be described next. FIG. 18A is a perspective view of a recording head that is a main portion of the ink jet color recording apparatus using the ink 80. FIG. 18B is a schematic side view of each ink ejection nozzle of the head, illustrating its printing operation. FIGS. 18A and 18B use the same reference numeral as used in FIGS. 13A and 13B to identify the same element of the fifth and third embodiments.

The recording head 85 of FIG. 18A includes an array of ink ejection nozzles 58 arranged in parallel, each for a respective one of different types of ink (different-colored solvents shown in FIG. 17).

As shown in FIGS. 18A and 18B, each ink ejection nozzle 58 has an ultrasonic element 61 and a heater 62 thereon in the vicinity of its ink ejection outlet 58a with the corresponding ink cartridge 87 being connected through a junction path 88 to a rear (right) end of the nozzle in FIGS. 18A and 18B.

The ink cartridges 87 contain the respective types of color ink 80 (80m, 80c, 80y or 80k), which are supplied to the corresponding ink ejection nozzles 58 so that the nozzles are filled with the respective types of color ink to thereby form ink menisci 80a at the corresponding ink ejection outlets 58a of the nozzles 58.

Each ultrasonic element 61 is disposed on an upper surface of the corresponding nozzle 58 immediately after the ejection outlet 58a and each heater 62 is disposed on a lower surface of the nozzle 58 immediately after the ultrasonic element 61. The ultrasonic element 61 and the heater 62 are connected through drive electrodes (not shown) to the corresponding ultrasonic element and heater drivers (not shown), respectively, of the controller (not shown).

Each of the ink ejection nozzles 58 of the recording head 85 ejects a colored ink droplet 80b from its ink outlet 58a. The ejected ink droplet 80b hits the printing paper P at an aimed position to thereby form a colored dot of a predetermined size (usually, of a pixel size) on the paper P.

The ink ejection nozzle 58 and the printing paper P are moved relative to each other by a moving device (not shown) in the primary and secondary scan directions, respectively, to thereby print desired characters/images on the printing paper P.

Ejection of the colored ink droplet 80b from the ejection nozzle 58 in this embodiment is substantially the same as in the third embodiment of FIGS. 14A–14F excluding that the ink ejection nozzle 58 is filled beforehand with predetermined colored ink.

As will be obvious from the above, the present embodiment is similar to the third embodiment in that microcapsules are colored for each ink droplet, but different in that two types of ink of a general color and its lighter color need not be prepared even when an image is formed in concentration gradations, and an image of concentration multigradations is formed using a minimum number of ink cartridges.

More particularly, it is assumed that the ink 80 shown in any one of FIGS. 17A–17D is used. When only the heater 62 is heated depending on information on the color components of the image and no ultrasonic waves are emitted from the ultrasonic element 61, the ink droplet ejected from the ink ejection nozzle 58 bears the original or lighter color of the solvent 81. When the heater 62 is heated depending on information on the color components of the image and the ultrasonic element 61 emits ultrasonic waves, the ink droplet ejected from the ink ejection nozzle 58 bears a thicker color exhibited by a mixture of a general color produced by destroying the outer shells 83 of the small microcapsules 83 and the original color of the solvent 81.

As described above, according to the present invention a type of color ink is used to produce a color of a thicker concentration than the original color of the ink. Thus, a precise image is formed in concentration gradations whose number is two times the number of ink cartridges to be used. That is, a precise images is formed in concentration gradations using a reduced number of ink cartridges to easy to manage.

Sixth Embodiment

A sixth embodiment that provides an image of multicolor concentration gradation, using only one kind of ink, will be described.

Figure 19:
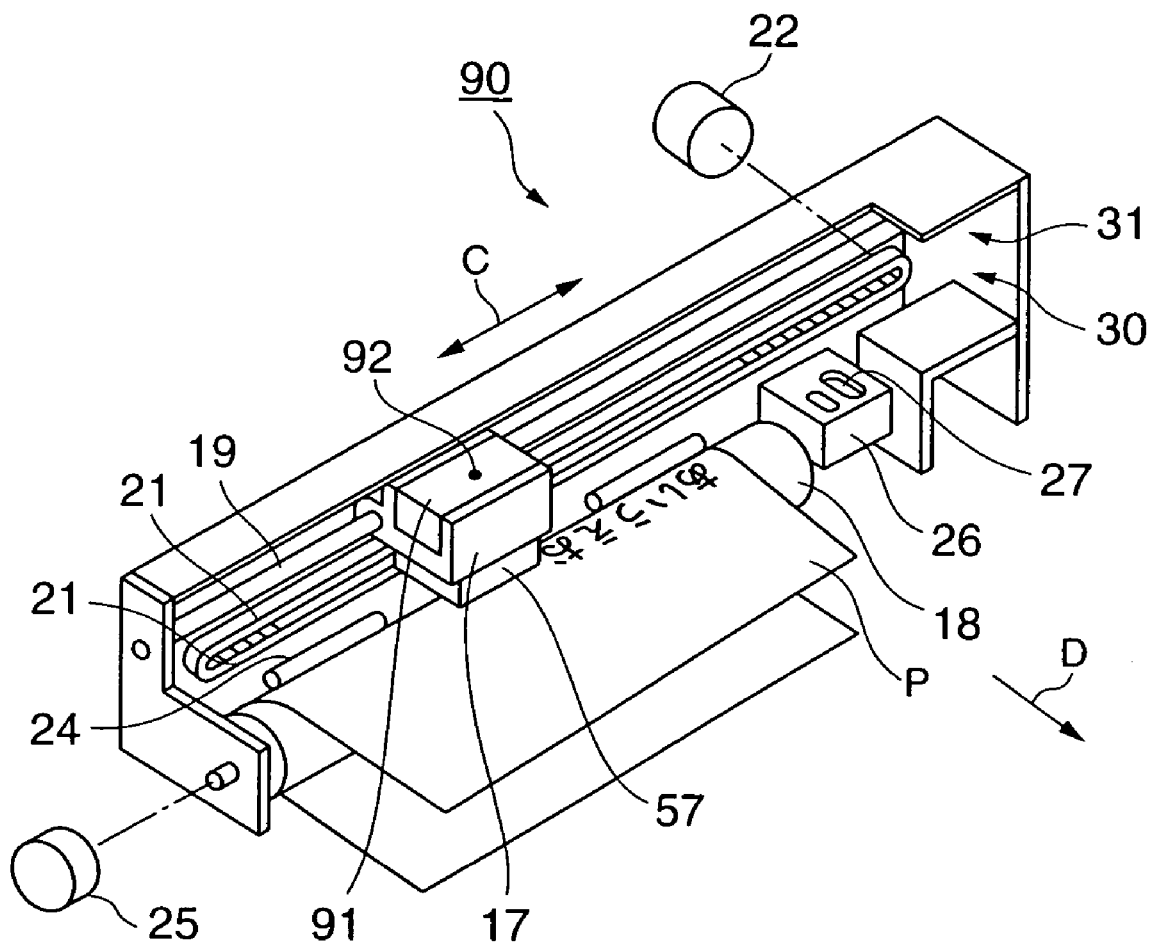
FIG. 19 is a schematic perspective view of an ink-jet color recording apparatus as a sixth embodiment.

FIG. 19 is a schematic perspective view of an ink-jet color recording apparatus as the sixth embodiment. The same reference numeral is used to denote the same element of the ink-jet color recording apparatus 90 and 15 of FIGS. 19 and 1.

As shown in FIG. 19, the ink-jet color recording apparatus 90 has basically the same structure as the ink-jet recording apparatus 15 of FIG. 1 except an ink cartridge 91 and a recording head 57. Therefore, detailed description of the apparatus 90 excluding the ink cartridge 91 will be omitted. The structure and printing operation of the recording head 57 of the sixth embodiment are substantially similar to those of the third embodiment and their description will be omitted.

The ink-jet recording apparatus 90 of this embodiment is characterized in that only one kind of ink cartridge 91 is provided as a removable ink container on the carriage 17. The ink cartridge 91 contains one kind of colorless or white ink to be described later in more detail, and has an ink inlet 92 on its upper surface.

An ink feeding device (not shown) is provided in an upper portion 31 of a space 30 to the right of the head-cleaning device 26. When the carriage 17 moves to the ink feeding device, the ink feed pipe of the ink feeding device is connected to the ink inlet 92 in the ink-lacking cartridge 91 to thereby feed the ink into the cartridge 91. The ink cartridge 91 may include a replaceable one filled beforehand with the ink. In this case, no ink-feeding device need be provided.

The inventive ink to be used in the ink-jet recording apparatus 90 will be described with reference to FIG. 20.

Figure 20:
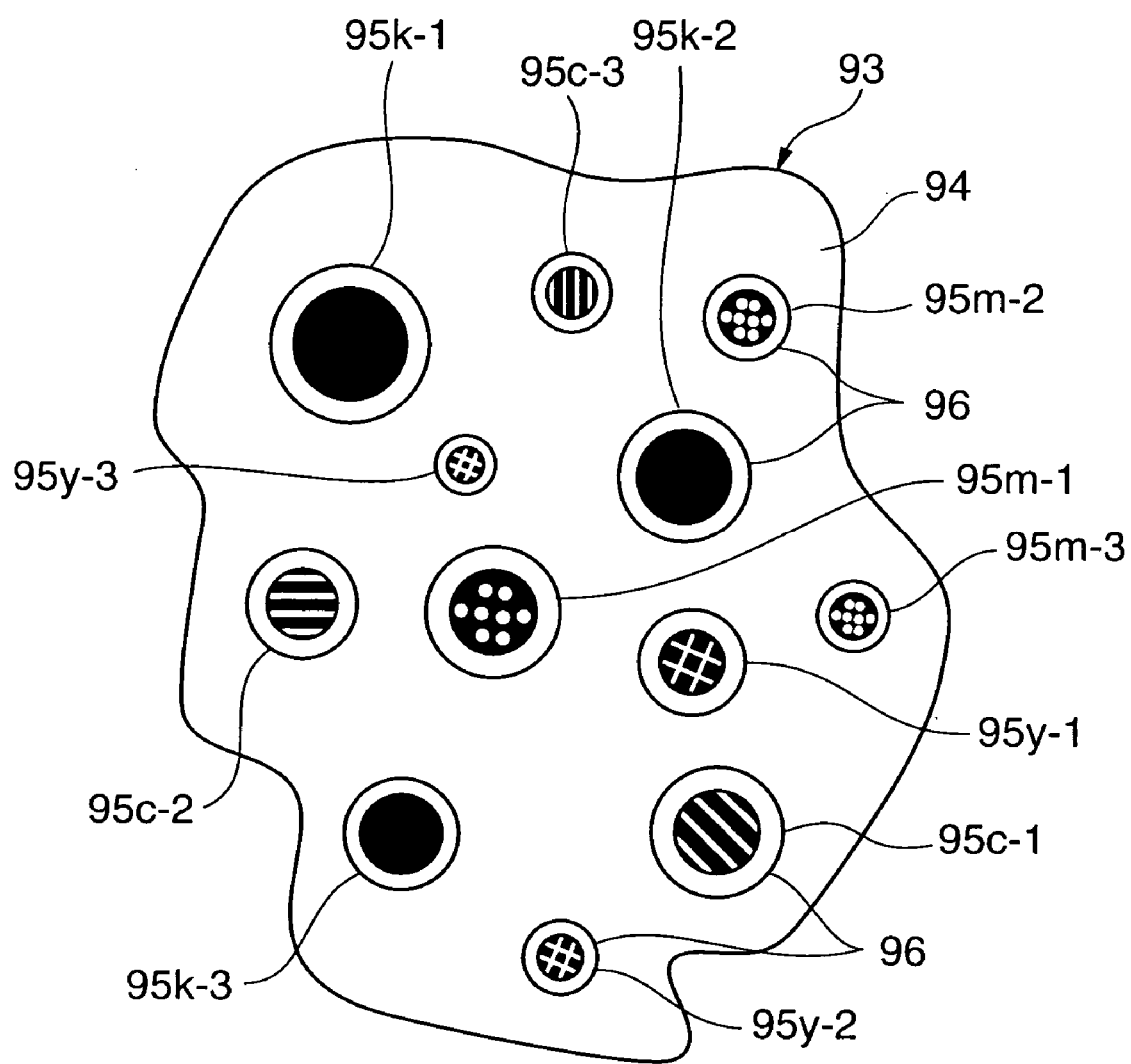
FIG. 20 illustrates the composition of inventive ink for use in the ink-jet color recording apparatus of the sixth embodiment.

In this embodiment, the ink 93 shown in FIG. 20 contains a plurality of different microcapsules dispersed randomly in a colorless solvent 94; that is, four different kinds of microcapsules; magenta, cyan, yellow and black microcapsules (95$m$-1, 95$m$-2, 95$m$-3); (95$c$-1, 95$c$-2, 95$c$-3); (95$y$-1, 95$y$-2, 95$y$-3); and (95$k$-1, 95$k$-2, 95$k$-3).

The microcapsules 95$m$, 95$c$, 95$y$, 95$k$ will produce magenta, cyan, yellow and black colors, respectively, and have outer shells 96 destroyable by ultrasonic waves of the corresponding different resonant frequencies, respectively. Also, in this case a color former is contained within the outer shell 96 and a developer is dispersed in the solvent 94 outside the outer shell 96. The ink 93 is colorless or white as a whole.

The microcapsules 95$m$, 95$c$, 95$y$ and 95$k$ of FIG. 20 are constituted so as to be different in diameter, for example, in a range of approximately 0.5–2 μm depending on their respective colors. In addition, the microcapsules 95 of the same color are constituted so as to have three different diameters (for example, the microcapsules 95$m$ have three different diameters identified by 95$m$-1, 95$m$-2, 95$m$-3. The microcapsules 95$m$, 95$c$, 95$y$ and 95$k$ are also different in outer shell diameter, thickness and material. Thus, the microcapsules 95$m$ (95$m$-1, 95$m$-2, 95$m$-3), 95$c$ (95$c$-1, 95$c$-2, 95$c$-3), 95$y$ (95$y$-1, 95$y$-2, 95$y$-3) and 95$k$ (95$k$-1, 95$k$-2, 95$k$-3) different in diameter [i.e. 12 (=4(colors)×3 (diameters)) kinds of microcapsules 95 in all] have different outer shells 96 destroyable by ultrasonic waves of the corresponding different resonant frequencies. Predetermined ones of the 12 kinds of microcapsules 95 will be destroyed with irradiation of ultrasonic waves of corresponding resonant frequency as a predetermined stimulus. As a result, the color former and developer within and outside the outer shell of each of the predetermined microcapsules are dispersed and mixed to thereby react to produce a corresponding color. When a large microcapsule 95 is destroyed, the whole ink is thicker colored whereas when a small microcapsule 95 is destroyed, the whole ink is thinner colored.

Also, in this case it is set that a total of volumes of the microcapsules 95 of one color is equal to the total of volumes of the microcapsules of another color such that their microcapsules are dispersed so as to mix uniformly with each other.

Thus, an ink-jet color recording apparatus and method providing an image of multicolor concentration gradation using one kind of ink 93 are realized.

Seventh Embodiment

Figure 21:
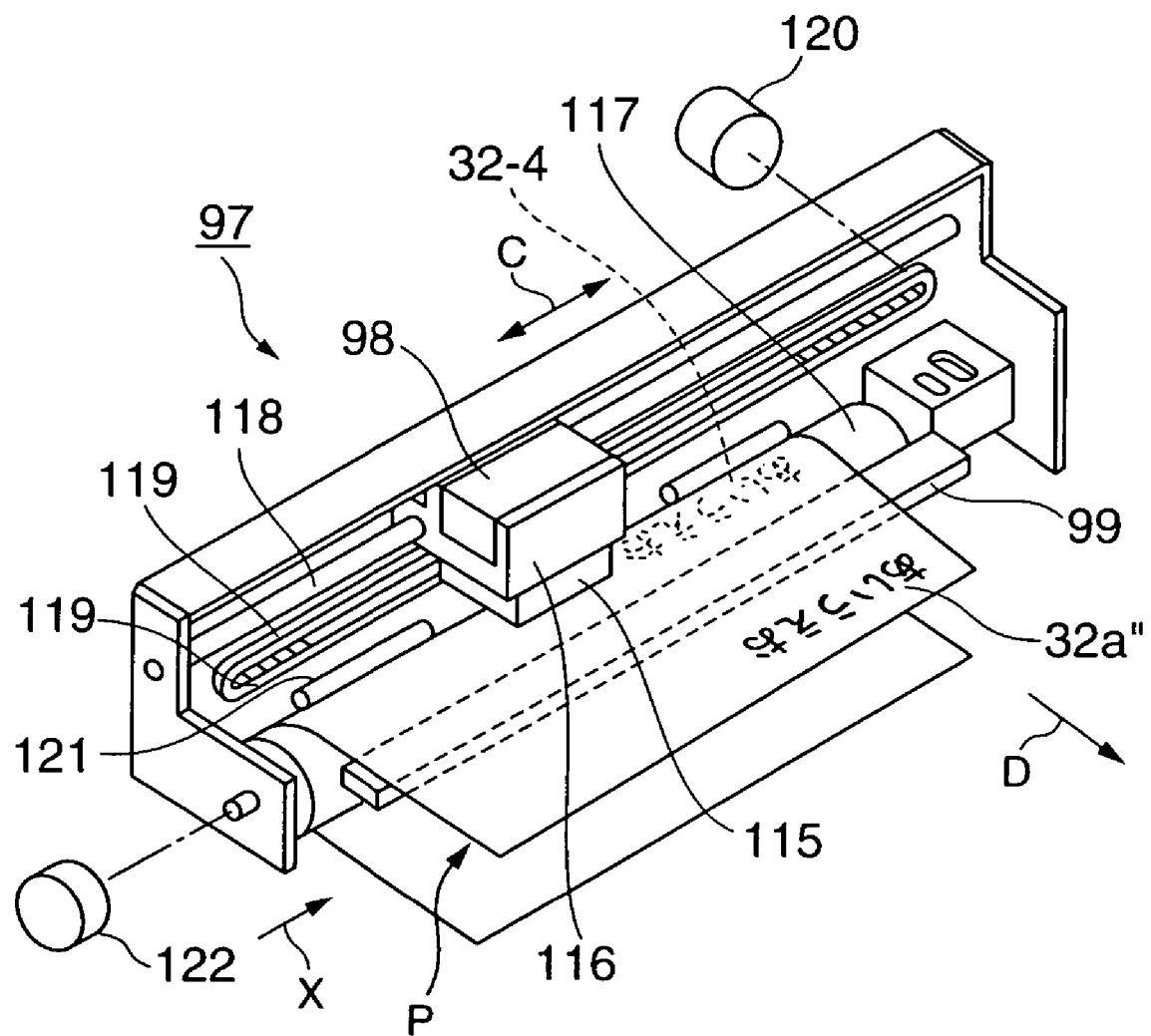
FIG. 21 is a perspective view of a main portion of an ink-jet color recording apparatus in a seventh embodiment.

FIG. 21 is a schematic perspective view of an ink-jet color recording apparatus as a seventh embodiment. The same reference numeral is used to denote the same component of the recording apparatus of the seventh embodiment and the conventional printer 114 of FIG. 25.

As shown in FIG. 21, the ink-jet color recording apparatus 79 includes a carriage drive system that in turn includes a printing head 115, a carriage 116, a guide shaft 33, a toothed belt 119, and a motor 120; and a paper conveying/printing system that includes a platen roller 117, a pair of auxiliary rollers 121, a motor 122, and an ultrasonic line head unit 99. A single ink cartridge 89 that contains only one kind of colorless ink shown in the first or sixth embodiment is set removably to the carriage 116.

Figure 25:
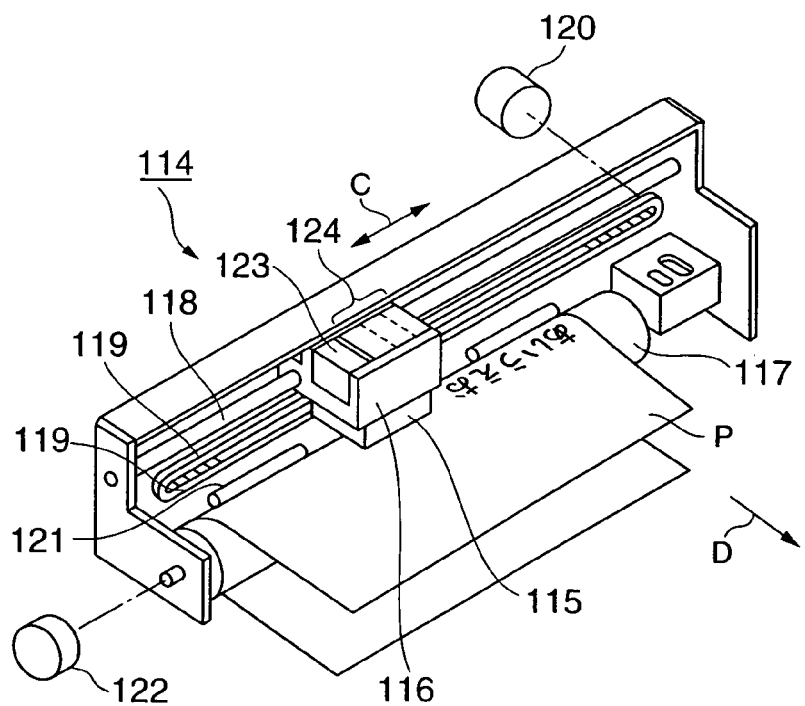
FIG. 25 is a schematic perspective view of a conventional color printer of an ink-jet recording type in which a full-color printing head and an ink cartridge are formed separately.

The printing head 115, carriage 116, guide shaft 118, toothed belt 119, motor 120, platen roller 117, auxiliary rollers 121, and motor 122 are the same in structure and function as the conventional printer 114 of FIG. 25.

The ink-jet color recording apparatus 97 of FIG. 21 is different from the printer 114 of FIG. 25 in that as described above, the single ink cartridge 98 that contains only one kind of colorless ink (FIGS. 2A, 2B or 20) is set removably on the carriage 116 and that the ultrasonic line head unit 99 is disposed downstream of the platen roller 117 that conveys printing paper P.

The ultrasonic line head unit 99 abuts on the recording paper P from below and guides the paper P in the conveyance direction. The line head unit 99 also irradiates a colorless ink droplet 32 (or 32'), ejected against the recording paper P in accordance with the image information, with ultrasonic waves of a predetermined resonant frequency from a back of the recording paper P through this paper to thereby produce ink 32$a$" colored depending on the image information.

FIGS. 22A–22E illustrate ejection of a droplet 32-3 of the colorless ink 32 from the ink ejection nozzle of the printing head 115 (that has a conventional structure).

Figure 22A:
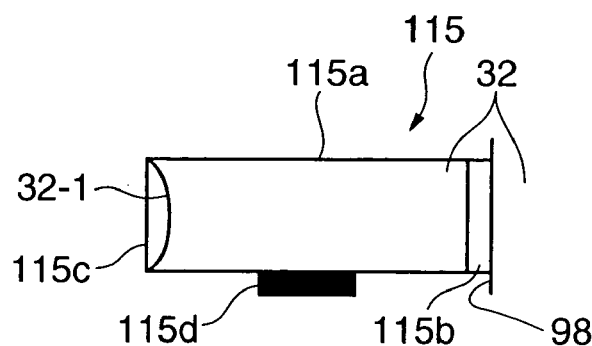
FIGS. 22A, 22B, 22C, 22D and 22E cooperatively illustrate spitting out of a colorless ink droplet against printing paper by each of the ejection nozzles of the printing head of the ink-jet color recording apparatus of FIG. 21.

In a standby state of FIG. 22A, the colorless ink 32 within the ink ejection nozzle 115a of the printing head 115 fed through the connection path 115b from the ink cartridge 98 forms a meniscus 32-1 at the nozzle outlet 115c.

Figure 22B:
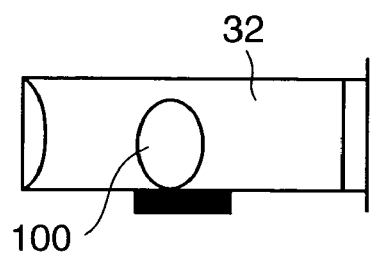

When the heater 115d is then electrically driven in accordance with image information from the controller (not shown), many minute core bubbles are produced between the heater 115d and ink 32 and united to produce a film bubble 100, as shown in FIG. 22B.

Figure 22C:
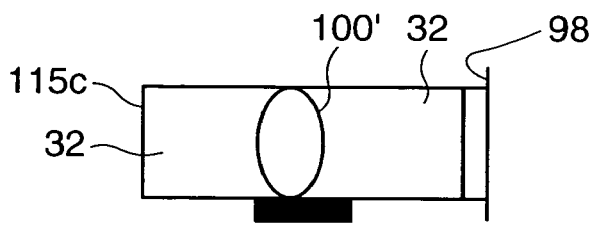

As shown in FIG. 22C, the film bubble 110 then grows into a further large film bubble 100' due to adiabatic expansion to thereby separate the ink 32 within the nozzle 115 into those on the sides of the ejection outlet 115c and the cartridge 98.

Figure 22D:
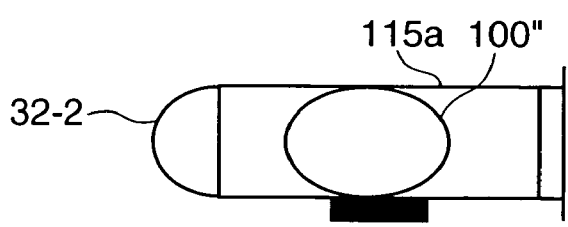
Figure 22E:
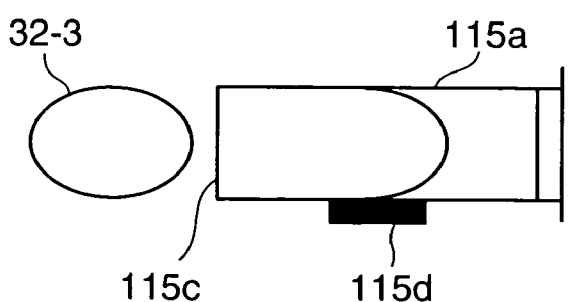

Then, as shown in FIG. 22D, the film bubble 100' grows into a further greater film bubble 100" whose pressure pushes away its peripheral ink 32 to thereby form an outward ink protrusion 32-2 at the outlet 115c of the nozzle 115. The film bubble 110" further grows to thereby separate the ink protrusion 32-2 away from the nozzle outlet 115c as an ink droplet 32-3 that is then ejected to hit against the paper P of FIG. 21.

Then, the film bubble 100" is rapidly shrunken and the situation then return to that of FIG. 22A. This period of operation is not more than approximately 300 μsec.

Figure 23:
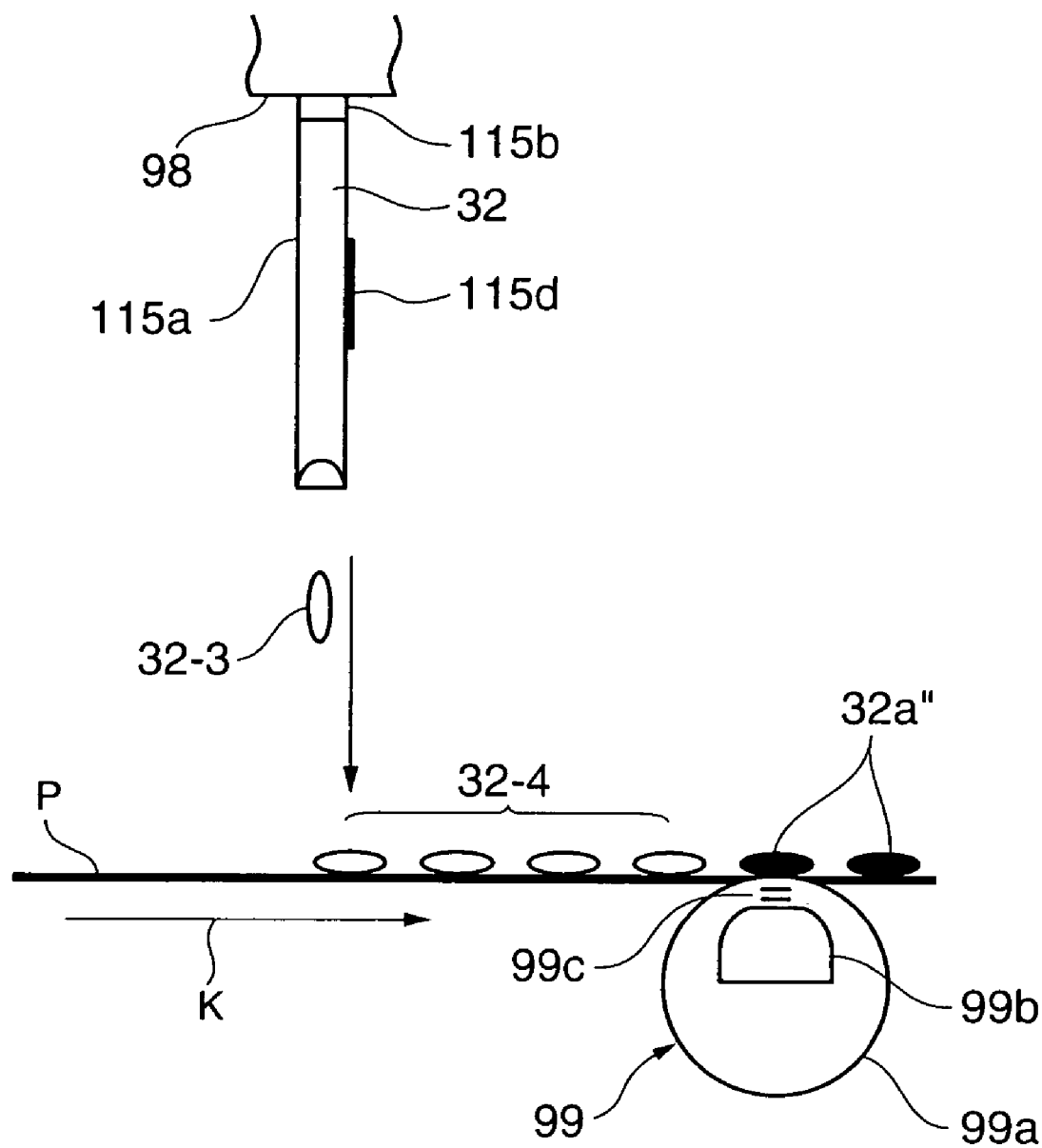
FIG. 23 illustrates a positional relationship between each of the ink ejection nozzles of the printing head of the ink-jet color recording apparatus of FIG. 21, printing paper, and an ultrasonic line head unit of the recording apparatus, and their operation.
Figure 24:
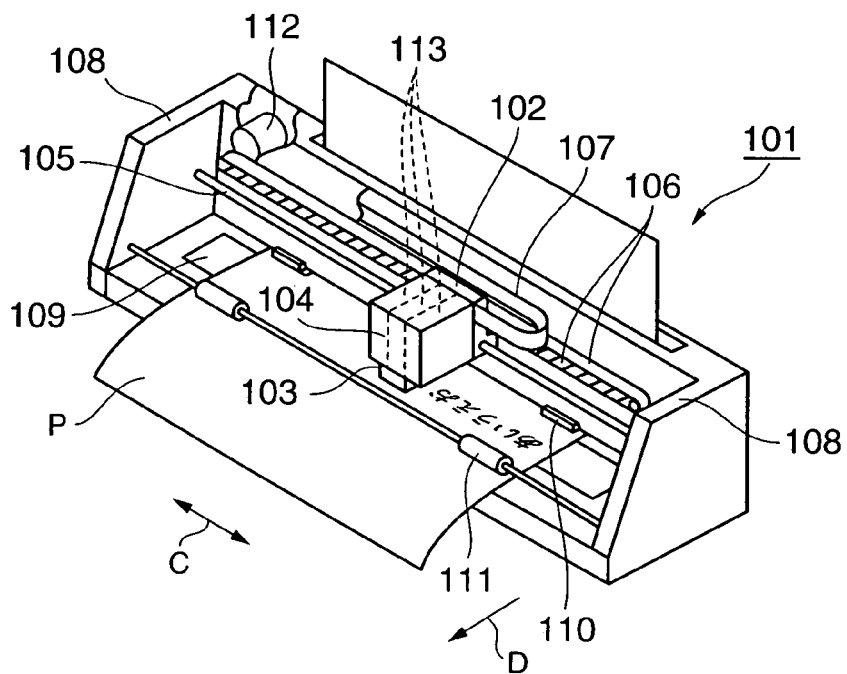
FIG. 24 is a schematic perspective view of a conventional color printer of an ink-jet recording type in which a full-color printing head and an ink cartridge are integrally formed as a unit.

FIG. 23 illustrates a positional relationship between the ink ejection nozzle 115a of the printing head 115, the paper P, and the ultrasonic line head unit 99 and their operation when those elements are viewed in the direction of an arrow X in FIG. 21. In FIG. 23, the same reference numeral is used to denote the same element as in FIGS. 21 and 22.

In FIG. 23, the printing paper P is conveyed in the direction of an arrow K. Ink droplets 32-3 ejected one at a time from the nozzle 115a hit against the recording paper P to thereby form a colorless ink image 32-4 (also see FIG. 21).

While in FIG. 23 only one ink ejection nozzle 115a is illustrated, scores of ink ejection nozzles 115a whose outlet diameter is, for example, 40 μm, are arranged at appropriate intervals in a line in a direction perpendicular to the paper face of FIG. 23 with their ejection outlets open to the lower ink ejection face (not shown in FIG. 21) of the printing head 115 of FIG. 21. The ink ejection nozzles 115 eject ink droplets 32-3 colored depending on an ORed combination of magenta, cyan, yellow and black items of image information.

The ultrasonic line head unit 99 disposed at a downstream position in the paper conveying path includes a hollow cylindrical plastic head case 99a extending perpendicular to the paper face of FIG. 23 and an ultrasonic line head 99b housed within the head case 99a and extending along the longitudinal axis of the head case 99a.

The line head case 99a is in contact with a back of the recording paper P across the recording paper P, or perpendicular to the conveying direction of the recording paper P, such that there is no gap between the outer surface of the head case 99a and the back of the recording paper P.

The ultrasonic line head 99b has substantially the same structure as the ultrasonic generator 40 of FIGS. 4–6 and irradiates the recording paper P with ultrasonic waves 99c of a predetermined frequency. Although not shown, the space between the ultrasonic wave irradiation unit of the ultrasonic line head 99b and the inner surface of the head case 99a is filled with a liquid.

Almost all the liquids or solids have the function of transmitting ultrasonic waves strongly and efficiently. The ultrasonic waves emitted from the ultrasonic line head 99b are efficiently transmitted through the liquid from the inner surface of the head case 99a to its outer surface.

These ultrasonic waves are then transmitted efficiently from the head case 99a through the recording paper P to a colorless ink image 32-4 formed on the front surface of the recording paper P. Thus, the image 32-4 is changed to an image of a predetermined color 32a".

As described above, according to this embodiment, after colorless ink droplets are ejected against the paper based on an ORed combination of magenta, cyan yellow and black items of the image information the ink droplets deposited on the paper are irradiated with ultrasonic waves corresponding to the different color items of the image information. Therefore, ink management is easy. In addition, a color image is easily formed only by altering to some extent the conventional recording apparatus with the printing head.

As described above, according to the present invention a desired one selected from a plurality of (for example, four) different colors can be produced as required from one kind of ink. Thus, management of each color is unnecessary and not troublesome, and the system is very handy. In addition, a quantity of ink reserve can be reduced. Wasteful use of a cartridge assembly of ink cartridges in the past such as abandonment of the cartridge assembly made even when some of the cartridges remained unused if the other cartridges were used up.

Four different types of color ink can be produced from one kind of ink, so that an ink-jet color recording apparatus is provided that facilitates ink management and use. Since a single arrangement that can fulfill both a coloring function and a supplementary-ink feeding function is provided, an ink-jet color recording apparatus is reduced in size and weight.

Since production of four different colors and security printing can be performed simultaneously, using one kind of ink, ordinary printing and security printing need not be performed separately to thereby improve the efficiency of printing with security.

Also, since an arrangement is provided that can produce a thicker color than that of the original color ink from this ink as required, a precise color image can be formed in concentration gradations whose number is two times the number of the ink cartridges to be used. Thus, a precise image can be formed in concentration multigradations, using a reduced number of ink cartridges that facilitate management.

In addition, since at least three light colors and at least two different concentration colors thicker than each of those light colors can be produced using one kind of ink, management of ink cartridges is facilitated and a precise color image can be formed in concentration multigradations.

Various modifications and changes may be made thereunto without departing from the broad spirit and scope of this invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2002-381120 filed on Dec. 27, 2002 and No. 2003-90194 filed on Mar. 28, 2003 and including specification, claims, drawings and summary. The disclosure of the above Japanese patent applications is incorporated herein by reference in its entirety.

What is claimed is:

1. Ink for ink-jet color recording, the ink comprising one of: (i) a plurality of small microcapsules dispersed in a same solvent, and (ii) a plurality of large microcapsules dispersed in the same solvent, each large microcapsule containing a plurality of the small microcapsules;

wherein each small microcapsule has an outer shell which has a characteristic that is different from characteristics of outer shells of other small microcapsules and which is destroyable with a predetermined stimulus corresponding to the characteristic thereof;

wherein each small microcapsule contains, in a dispersed state within the outer shell thereof, a first one of two reactive materials that react with each other when mixed to perform a coloring reaction, wherein a second one of the two reactive materials is dispersed outside the outer shell of the small microcapsule in the same solvent, and wherein the two reactive materials are diffused and mixed to thereby perform a coloring reaction when the outer shell of the small microcapsule is destroyed with the predetermined stimulus; and wherein the outer shell of each of the plurality of small microcapsules is selectively destroyable by the predetermined stimulus corresponding thereto, such that a desired coloring reaction is performed to realize a predetermined color by selectively destroying the outer shells of small microcapsules corresponding to the desired color reaction.

2. The ink according to claim 1, wherein the solvent is substantially colorless, the small and large microcapsules are substantially colorless before the coloring reaction, and the plurality of small microcapsules include, in a mixed state, a plurality of different kinds of small microcapsules for producing a plurality of different colors, respectively, when the outer shells thereof are destroyed with the corresponding predetermined stimuli.

3. The ink according to claim 2, wherein the plurality of kinds of small microcapsules produce colors of magenta, cyan, yellow and black, respectively.

4. The ink according to claim 1, wherein the predetermined stimulus comprises ultrasonic waves and the outer shell of the small microcapsule is destroyed by ultrasonic waves of a resonant frequency corresponding to the characteristic of the outer shell, which is based on at least one of a material, thickness and diameter thereof.

5. The ink according to claim 1, wherein each small microcapsule includes a security-printing fluorescent material dispersed at least one of outside and inside the outer shell thereof such that a print printed with the ink generates fluorescence when irradiated with ultraviolet rays.

6. Ink for ink-jet color recording, the ink comprising a solvent and one of: (i) a plurality of small microcapsules and (ii) a plurality of large microcapsules dispersed in the solvent, each large microcapsule containing a plurality of the small microcapsules;

wherein each small microcapsule has an outer shell that is destroyable with a predetermined stimulus, each small microcapsule contains, in a dispersed state within the outer shell thereof, a first one of two reactive materials that react with each other when mixed to perform a coloring reaction, wherein a second one of the two reactive materials is dispersed outside the outer shell of the small microcapsule in the solvent, and wherein when the outer shell of the small microcapsule is destroyed by the predetermined stimulus the two reactive materials are diffused and mixed to thereby perform the coloring reaction; and wherein the solvent is precolored in a predetermined color, and each of the plurality of small microcapsules produces the same color as the solvent when the outer shell thereof is destroyed to perform the coloring reaction.

7. The ink according to claim 6, wherein the solvent has a color of one of magenta, cyan, yellow and black.

8. A color ink feeding device for feeding a plurality of different types of color ink to a corresponding plurality of ink containing units, respectively, the device comprising:

an ink container for containing ink that comprises a solvent and one of: (i) a plurality of different kinds of small microcapsules dispersed in the solvent and (ii) a plurality of large microcapsules dispersed in the solvent, each large microcapsule containing a plurality of the small microcapsules, wherein each small microcapsule has an outer shell that is destroyable with a corresponding predetermined stimulus, and each small microcapsule contains, in a dispersed state within the outer shell thereof, a first one of two reactive materials that react with each other when mixed to perform a coloring operation, wherein a second one of the two reactive materials is dispersed outside the outer shell of the microcapsule in the solvent, and wherein when the outer shell of the microcapsule is destroyed by the predetermined stimulus the two reactive materials are diffused and mixed to thereby perform the coloring reaction;

ink distributing means for separating and feeding a part of the ink contained in the ink container to one of the ink containing units; and a coloring unit for coloring the separated part of the ink in a color corespnonding to the one of the ink containing units by applying the corresponding predetermined stimulus such that the part of the ink is colored before being fed to the one of the ink containing units.

9. The device according to claim 8, wherein the solvent is substantially colorless, and the small and large microcapsules are substantially colorless before the coloring reaction.

10. The device according to claim 9, wherein the plurality of different kinds of small microcapsules produce colors of magenta, cyan, yellow and black, respectively.

11. The device according to claim 8, wherein the predetermined stimulus comprises ultrasonic waves and the outer shell of each small microcapsule is destroyed by ultrasonic waves of a resonant frequency corresponding to the characteristic of the outer shell, which is based on at least one of a material, thickness and diameter thereof.

12. An ink-jet color recording apparatus for ejecting from a printing head a plurality of different types of color ink fed from a corresponding plurality of ink containing units, respectively, to thereby record an image or data on paper, the apparatus comprising:

an ink container for containing ink that comprises a solvent and one of: (i) a plurality of kinds of small microcapsules dispersed in the solvent and (ii) a plurality of large microcapsules dispersed in the solvent, each large microcapsule containing a plurality of the kinds of small microcapsules, wherein the small microcapsules of each type have outer shells that are destroyable with a predetermined stimulus corresponding to the type of small microcapsules, wherein each small microcapsule contains, in a dispersed state within the outer shell thereof, a first one of two reactive materials that react with each other when mixed to perform a coloring operation, wherein a second one of the two reactive materials is dispersed outside the outer shell of the small microcapsule in the solvent, and wherein when the outer shell of the small microcapsule is destroyed by the predetermined stimulus the two reactive materials are dispersed and mixed to thereby perform the coloring reaction;

ink distributing means for separating and feeding a part of the ink contained in the ink container to one of the ink containing units; and a coloring unit for coloring the separated part of the ink in a color corresponding to the one of the ink containing units by applying the corresponding predetermined stimulus such that the part of the ink is colored before being fed to the one of the ink containing units.

13. The apparatus according to claim 12, wherein the solvent is substantially colorless, and the small and large microcapsules are substantially colorless before the coloring reaction.

14. The apparatus according to claim 13, wherein the plurality of kinds of different small microcapsules produce colors of magenta, cyan, yellow and black, respectively.

15. The apparatus according to claim 12, wherein the predetermined stimulus comprises ultrasonic waves and the outer shell of each small microcapsule is destroyed by ultrasonic waves of a resonant frequency corresponding to the characteristic of the outer shell, which is based on at least one of a material, thickness and diameter thereof.

16. An ink-let color recording method of electing from a printing head a plurality of different types of color ink fed from a like number of ink containing units, respectively, to thereby record an image or data on paper, the method comprising:

providing an ink container containing ink that comprises a solvent and one of: (i) a plurality of different kinds of small microcapsules dispersed in the solvent and (ii) a plurality of large microcapsules dispersed in the solvent, each large microcapsule containing a plurality of the kinds of small microcapsules, the small microcapsules of each type having outer shells that are destroyable with a predetermined stimulus corresponding to the type of small microcapsules, wherein each small microcapsule contains, in a dispersed state within the outer shell thereof, a first one of two reactive materials that react with each other when mixed to perform a coloring operation, wherein a second one of the two reactive materials is dispersed outside the outer shell of the small microcapsule in the solvent, and wherein when the outer shell is destroyed with the predetermined stimulus the two reactive materials are dispersed and mixed to thereby perform a coloring reaction;

separating and feeding a part of the ink contained in the ink container to one of the ink containing units; and coloring the separated part of the ink in a color corresponding to the one of the ink containing units by applying the corresponding predetermined stimulus such that the part of the ink is colored before being fed to the one of the ink containing units.

17. The method according to claim 16, wherein the solvent is substantially colorless, and the small and large microcapsules are substantially colorless before the coloring reaction.

18. The method according to claim 17, wherein the plurality of kinds of different small microcapsules produce colors of magenta, cyan, yellow and black, respectively.

19. The method according to claim 16, wherein the predetermined stimulus comprises ultrasonic waves and the outer shell of each small microcapsule is destroyed by ultrasonic waves of a resonant frequency corresponding to the characteristic of the outer shell, which is based on at least one of a material, thickness and diameter thereof.

20. An ink-jet color recording apparatus using ink that comprises one of: (i) a plurality of small microcapsules dispersed in a same solvent, and (ii) a plurality of large microcapsules dispersed in the same solvent, each large microcapsule containing a plurality of the small microcapsules, wherein each small microcapsule has an outer shell which has a characteristic that is different from characteristics of outer shells of other small microcapsules, and which is destroyable with a predetermined stimulus corresponding to the characteristic thereof, wherein each small microcapsule contains, in a dispersed state within the outer shell thereof, a first one of two reactive materials that react to each other when mixed to perform a coloring reaction, wherein a second one of the two reactive materials is dispersed outside the outer shell of the small microcapsule in the same solvent, wherein the reactive materials are diffused and mixed to thereby perform a coloring reaction when the outer shell of the small microcapsule is destroyed with the predetermined stimulus, and wherein the outer shell of each of the plurality of small microcapsules is selectively destroyable by the predetermined stimulus corresponding thereto, such that a desired coloring reaction is performed to realize a predetermined color by selectively destroying the outer shells of small microcapsules corresponding to the desired color reaction; the apparatus comprising:

an ink ejection nozzle to which the ink is fed and which includes an ink ejection outlet for ejecting the ink therethrough;

coloring means disposed in a vicinity of the ink ejection outlet of the ink ejection nozzle for coloring the ink in the vicinity of the ejection outlet via the coloring reaction by giving the microcapsules of the ink in the vicinity of the ink ejection outlet a stimulus based on information on a color component of an image to be recorded to thereby destroy the outer shells of the small microcapsules corresponding to the stimulus; and ink droplet discharging means disposed inward in the ink ejection nozzle with respect to the ink injection outlet, for ejecting an ink droplet of the ink colored by the coloring means to thereby form a color image on recording paper.

21. The ink-jet color recording apparatus according to claim 20, wherein the coloring means comprises an ultrasonic element for irradiating the ink with ultrasonic waves of a predetermined frequency, and wherein the ink droplet ejecting means comprises a heater for heating the ink to produce film bubbles in the ink.

22. The ink-jet color recording apparatus according to claim 20, wherein a plurality of the ink ejection nozzles are arranged in parallel in a line to thereby compose a multi-nozzle line recording head.

23. The ink-jet color recording apparatus according to claim 20, wherein the solvent is substantially colorless, the small and large microcapsules are substantially colorless before the coloring reaction, and the plurality of small microcapsules include, in a mixed state, a plurality of different kinds of small microcapsules for producing a plurality of different colors, respectively, when the outer shells thereof are destroyed with the corresponding predetermined stimuli.

24. The ink-jet color recording apparatus according to claim 23, wherein the plurality of kinds of small microcapsules produce the colors of magenta, cyan, yellow and black, respectively.

25. The ink-jet color recording apparatus according to claim 20, wherein the solvent is precolored in a predetermined color, and the plurality of small microcapsules produce the same color as the color of the solvent when the outer shell thereof is destroyed to perform the coloring reaction;

wherein the ink ejection nozzle ejects through the ejection outlet an ink droplet with only the color of the precolored solvent when no predetermined stimulus is given to the ink in accordance with the information on the color component of the image to be recorded; and wherein the ink ejection nozzle ejects through the ejection outlet an ink droplet with a thickened color comprising a mixture of the color of the precolored solvent and the color produced in the coloring reaction when the ink coloring means gives the ink the predetermined stimulus in accordance with the information on the color component of the image to be recorded.

26. The ink-jet color recording apparatus according to claim 23, wherein the solvent has a color of one of magenta, cyan, yellow and black.

27. An ink-jet color recording method using ink that comprises one of: (i) a plurality of kinds of small microcapsules dispersed in a same solvent, and (ii) a plurality of large microcapsules dispersed in the same solvent, each large microcapsule containing a plurality of the kinds of small microcapsules, wherein each small microcapsule has an outer shell which has a characteristic that is different from characteristics of outer shells of other small microcapsules, and which is destroyable with a predetermined stimulus corresponding to the characteristic thereof, wherein each small microcapsule contains, in a dispersed state within the outer shell thereof, a first one of two reactive materials that react to each other when mixed to perform a coloring reaction, wherein a second one of the two reactive materials is dispersed outside the outer shell of the small microcapsule in the same solvent, wherein the reactive materials are diffused and mixed to thereby perform the coloring reaction when the outer shell of the small microcapsule is destroyed with the predetermined stimulus, and wherein the outer shell of each of the plurality of small microcapsules is selectively destroyable by the predetermined stimulus corresponding thereto, such that a desired coloring reaction is performed to realize a predetermined color by selectively destroying the outer shells of small microcapsules corresponding to the desired color reaction, the method comprising:

coloring the ink when the ink is in a vicinity of an ejection outlet of an ink ejection nozzle by giving the ink in the vicinity of the ink ejection outlet a stimulus based on information on a color component of an image to be recorded to thereby destroy the outer shells of the small microcapsules of the ink corresponding to the stimulus to perform the desired coloring reaction; and ejecting an ink droplet of the colored ink to thereby form a color image on recording paper.

28. The ink-jet color recording method according to claim 27, wherein the coloring comprises irradiating the ink with ultrasonic waves of a predetermined frequency, and wherein the ejecting of the ink droplet comprises heating the ink to produce film bubbles in the ink.

29. The ink-jet color recording method according to claim 27, wherein the ejecting of the ink droplet comprises ejecting ink droplets simultaneously from a plurality of nozzles disposed in parallel.

30. The ink-jet color recording method according to claim 27, wherein the solvent is substantially colorless, the small and large microcapsules are substantially colorless before the coloring reaction, and the plurality of small microcapsules include, in a mixed state, a plurality of different kinds of small microcapsules for producing a plurality of different colors, respectively, when the outer shells thereof are destroyed with the corresponding predetermined stimuli.

31. The ink-jet color recording method according to claim 30, wherein the plurality of kinds of small microcapsules produce colors of magenta, cyan, yellow and black, respectively.

32. An ink-jet color recording method using ink that comprises a solvent and one of: (i) a plurality of kinds of small microcapsules, and (ii) a plurality of large microcapsules dispersed in the solvent, each large microcapsule containing a plurality of the kinds of small microcapsules, wherein each small microcapsule has an outer shell which is destroyable with a predetermined stimulus, wherein each small microcapsule contains, in a dispersed state within the outer shell thereof one of two reactive materials that react to each other when mixed to perform a coloring reaction, wherein a second one of the two reactive materials is dispersed outside the outer shell of the small microcapsule in the solvent, wherein the reactive materials are diffused and mixed to thereby perform the coloring reaction when the outer shell of the small microcapsule is destroyed with the predetermined stimulus, the method comprising:

coloring the ink when the ink is in a vicinity of an ejection outlet of an ink ejection nozzle by giving the ink in the vicinity of the ink ejection outlet a stimulus based on information on a color component of an image to be recorded to thereby destroy the outer shells of the small microcapsules of the ink corresponding to the stimulus; and ejecting an ink droplet of the colored ink to thereby form a color image on recording paper;

wherein the solvent is precolored in a predetermined color, and the plurality of small microcapsules produces the same color as the color of the solvent when the outer shell thereof is destroyed to perform the coloring reaction;

wherein an ink droplet with the color of the precolored solvent is ejected through the ink ejection outlet when no predetermined stimulus is supplied to the ink in accordance with the information on the color component of the image to be recorded; and wherein an ink droplet with a thickened color comprising a mixture of the color of the precolored solvent and the color produced in the coloring reaction is ejected through the ink ejection outlet when the microcapsules are given the predetermined stimulus in accordance with the information on the color component of the image to be recorded.

33. The ink-jet color recording method according to claim 32, wherein the solvent has a color of one of magenta, cyan, yellow and black.

34. An ink-jet color recording apparatus using ink that comprises one of: (i) a plurality of kinds of small microcapsules dispersed in a same solvent, and (ii) a plurality of large microcapsules dispersed in the same solvent, each large microcapsule containing a plurality of the kinds of small microcapsules, wherein each small microcapsule has an outer shell which has a characteristic that is different from characteristics of outer shells of other small microcapsules, and which is destroyable with a predetermined stimulus corresponding to the characteristic thereof, wherein each small microcapsule contains, in a dispersed state within the outer shell thereof, a first one of two reactive materials that react to each other when mixed to perform a coloring reaction, wherein a second one of the two reactive materials is dispersed outside the outer shell of the small microcapsule in the same solvent, wherein the reactive materials are diffused and mixed to thereby perform a coloring reaction when the outer shell of the small microcapsule is destroyed with the predetermined stimulus, and wherein the outer shell of each of the plurality of small microcapsules is selectively destroyable by the predetermined stimulus corresponding thereto, such that a desired coloring reaction is performed to realize a predetermined color by selectively destroying the outer shells of small microcapsules corresponding to the desired color reaction, the apparatus comprising:

ink ejecting means having an ink ejection outlet for ejecting an ink droplet of the ink to recording paper in accordance with information on an image to be recorded such that the ejected ink droplet is deposited on a surface of the paper; and coloring means for coloring the ink droplet deposited on the paper by giving the ink droplet a predetermined stimulus based on information on a color component of the image to thereby destroy the outer shells of a specified kind of small microcapsules selected from the kinds of small microcapsules of the ink droplet and corresponding to the stimulus to perform the desired coloring reaction.

35. The apparatus according to claim 34, wherein the solvent is substantially colorless, and the small and large microcapsules are substantially colorless before the coloring reaction.

36. The apparatus according to claim 35, wherein the plurality of kinds of different small microcapsules produce colors of magenta, cyan, yellow and black, respectively.

37. The apparatus according to claim 34, wherein the predetermined stimulus comprises ultrasonic waves and the outer shell of each small microcapsule is destroyed by ultrasonic waves of a resonant frequency corresponding to the characteristic of the outer shell, which is based on at least one of a material, thickness and diameter thereof.

38. The apparatus according to claim 34, wherein the coloring means comprises an ultrasonic line head that abuts against an opposite surface of the paper from the surface on which the ink droplet is deposited, and the ultrasonic line head irradiates the ink droplet on the paper with ultrasonic waves through the paper.

39. An ink-jet color recording method using ink that comprises one of: (i) a plurality of kinds of small microcapsules dispersed in a same solvent, and (ii) a plurality of large microcapsules dispersed in the same solvent, each large microcapsule containing a plurality of the kinds of small microcapsules, wherein each small microcapsule has an outer shell which has a characteristic that is different from characteristics of outer shells of other small microcapsules, and which is destroyable with a predetermined stimulus corresponding to the characteristic thereof, wherein each small microcapsule contains, in a dispersed state within the outer shell thereof, a first one of two reactive materials that react to each other when mixed to perform a coloring reaction, wherein a second one of the two reactive materials is dispersed outside the outer shell of the small microcapsule in the same solvent, wherein the reactive materials are diffused and mixed to thereby perform a coloring reaction when the outer shell of the small microcapsule is destroyed with the predetermined stimulus, and wherein the outer shell of each of the plurality of small microcapsules is selectively destroyable by the predetermined stimulus corresponding thereto, such that a desired coloring reaction is performed to realize a predetermined color by selectively destroying the outer shells of small microcapsules corresponding to the desired color reaction, the method comprising:

ejecting an ink droplet of the ink from an ink ejection outlet to recording paper in accordance with information on an image to be recorded such that the ejected ink droplet is deposited on a surface of the paper; and coloring the deposited ink droplet in a desired color by giving the ink droplet deposited on the paper a predetermined stimulus based on information on a color component of the image to thereby destroy the outer shells of a specified kind of small microcapsules selected from the kinds of small microcapsules of the ink droplet and corresponding to the stimulus to perform the desired coloring reaction.

40. The method according to claim 39, wherein the solvent is substantially colorless, and the small and large microcapsules and substantially colorless before the coloring reaction.

41. The method according to claim 40, wherein the plurality of kinds of different small microcapsules produce colors of magenta, cyan, yellow and black, respectively.

42. The method according to claim 39, wherein the predetermined stimulus comprises ultrasonic waves and the outer shell of each small microcapsule is destroyed by ultrasonic waves of a resonant frequency corresponding to the characteristic of the outer shell, which is based on at least one of a material, thickness and diameter thereof.

43. The method according to claim 39, wherein the coloring comprises irradiating the ink droplet deposited on the paper with ultrasonic waves emitted by an ultrasonic line head that abuts against an opposite surface of the paper from the surface on which the ink droplet is deposited.

* * * * *